(12) United States Patent
Yuasa et al.

(10) Patent No.: US 6,184,888 B1
(45) Date of Patent: Feb. 6, 2001

(54) METHOD AND APPARATUS FOR RAPIDLY RENDERING AND IMAGE IN RESPONSE TO THREE-DIMENSIONAL GRAPHICS DATA IN A DATA RATE LIMITED ENVIRONMENT

(75) Inventors: Kei Yuasa, Tokyo (JP); Michael E. Goss, Mountain View, CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/126,935

(22) Filed: Jul. 30, 1998

(30) Foreign Application Priority Data

Oct. 31, 1997 (JP) .................................................. 9-315877
Feb. 28, 1998 (JP) ................................................ 10-064665

(51) Int. Cl.$^7$ ................................................ G06T 15/00
(52) U.S. Cl. ............................................................ 345/419
(58) Field of Search .................................. 345/419, 428, 345/430, 429

(56) References Cited

U.S. PATENT DOCUMENTS

| | | | |
|---|---|---|---|
| 5,438,654 | * 8/1995 | Drebin et al. ......................... | 345/439 |
| 5,490,240 | * 2/1996 | Foran et al. .......................... | 345/430 |
| 5,596,687 | * 1/1997 | Peters, Jr. ............................. | 345/430 |
| 5,760,783 | * 6/1998 | Migdal et al. ........................ | 345/428 |

* cited by examiner

Primary Examiner—Mark R. Powell
Assistant Examiner—Huedung X. Cao

(57) ABSTRACT

An image rendering apparatus that comprises an input path through which the rendering apparatus can receive three-dimensional graphics data, a pixel/depth buffer, a reference buffer and a rendering engine. The three-dimensional graphics data include polygon data and additionally include texture data defining a texture. The texture data include texture size data and sets of pattern data. The pattern data in each of the sets represent the texture with a different resolution. The pattern data constitute a majority of the texture data. The pixel/depth buffer and the reference buffer respectively include first memory cells and second memory cells that correspond to the pixels of a rendering screen. The rendering engine performs an initial rasterizing operation using only the polygon and texture size data to generate and to store in the reference buffer, for each of the pixels of the rendering screen, a texture identifier, a layer depth value indicating a texture resolution, and texture coordinates. The rendering engine also identifies, in response to the texture identifier, the layer depth and the texture coordinates stored in the reference buffer for each of the rendering screen pixels, the ones of the pattern data required to render the image. The rendering engine acquires via the path those of the pattern data identified as being required to render the image. Finally, the rendering engine generates image data representing the image using the pattern data acquired via the path. The path has a data transfer rate substantially smaller than the data transfer rates between the rendering engine and the buffers.

20 Claims, 9 Drawing Sheets

METHOD AND APPARATUS FOR RAPIDLY RENDERING AND IMAGE IN RESPONSE TO THREE-DIMENSIONAL GRAPHICS DATA IN A DATA RATE LIMITED ENVIRONMENT

FIELD OF THE INVENTION

The invention relates to a method and apparatus for rendering an image in response to three-dimensional graphics data and especially relates to a method and apparatus for rendering an image in response to three-dimensional graphics data in an environment, such as a network, in which the data rate is limited.

BACKGROUND OF THE INVENTION

Due to advances in the processing power of personal computers and other graphics processing devices such as video games, three-dimensional computer graphics (3D graphics) are becoming increasingly popular. The Internet is increasingly being used to deliver content that includes 3D graphics. Home personal computer (PC) users can download 3D graphics data from the Internet and can use browsers to render, display, and interact with the contents.

Rendering techniques for 3D graphics have been developed over a long time. The most recent techniques have been embodied in extension hardware that can be plugged into the graphics adaptors used in home PCs. Increases in the performance of PCs and graphics hardware permit increases in the complexity of the graphics that can be rendered. However, when the source of the 3D graphics data is a network that has a limited data transfer rate, a long loading time is required for the 3D graphics data when the image represented by the graphical data is complex. The Internet is an example of such a network. Known browser programs that run on client computers connected to the network require that substantially all of the 3D graphics data be loaded from the server before they can start performing the graphics rendering calculations necessary to display an image in response to the 3D graphics data. As a result, the user must wait for most of the loading time before the image starts to display. The processing structure of conventional 3D graphics rendering programs imposes long delays before such programs begin to display an image.

In 3D graphics, a three-dimensional space populated by one or more three-dimensional objects is defined. The position of a reference point on each object in the three-dimensional space is also defined. The shape of each object is defined in terms of a set of polygons that covers the surface of the object. For example, an equilateral cube may be defined in terms of six square polygons (squares), each of which is congruent with one of the faces of the cube. A size, a shape and coordinates are defined for each polygon. Additionally, a color and reflectivity may be defined. However, if all or part of a surface of the object is patterned, the polygon representing the surface must be divided into multiple sub-polygons so that the pattern can be represented by assigning different colors and reflectivities to the sub-polygons. This substantially increases the amount of data required to represent the object.

Consequently, if the surface of the object is to be rendered with more than rudimentary patterning, it is preferred to define the appearance of the surface using a texture. A texture is a set of data that represent a pattern of an arbitrary complexity ranging from a rudimentary bitmap to a complex image. The set of data may include image map data, for example, defining the pattern. The polygons representing parts of the surface of the object whose appearance is defined by the texture are tiled using the texture. When textures are used, an object having a complex surface appearance can be represented using fewer data than are required to represent the surface using an increased number of polygons.

When the three-dimensional space populated by three-dimensional objects is displayed as an image on a two-dimensional screen, such as the screen of a computer monitor, a view point is first chosen by the user or is defined by the graphical data. One or more sources of illumination are also defined, or may be chosen. An imaginary plane, called a rendering screen, located between the view point and the three-dimensional space is also defined. The rendering screen is divided into picture elements (pixels) in an arrangement that preferably corresponds to the number of pixels that will be used to display the image. For example, if the image is to be displayed on the screen of an NTSC television or a VGA computer display, the rendering screen is preferably divided into 640×480 pixels. The rendering program then calculates color values for each of the pixels constituting the rendering screen. The color values for each of the pixels normally include a red color value, a green color value and a blue color value. However, different color values such as luminance and color differences may be used. The image is then displayed in response to the color values of the pixels. This may be done, for example, by transferring the color values from the 3D-graphics extension hardware to the video memory of the graphics adaptor of the computer.

A conventional 3D-graphics rendering program that uses so-called Z-buffering may operate as follows:

1. Loading Phase: a complete set of graphics data is loaded from a server via a network or from local files.
2. Geometry Phase: the projections of the polygons onto the rendering screen are calculated. The results of these calculations include a depth value indicating the depth of each vertex of each polygon from the point of view.
3. Rasterizing Phase: shading and hidden surface removal operations are performed. A rasterizing operation is performed that converts the projected polygons into object pixels corresponding to the pixels of the rendering screen, and calculates a set of color values for each object pixel. Because the objects are three-dimensional, more than one polygon may project onto a given pixel of the rendering screen. Consequently, color and depth values for more than one object pixel are generated where polygons overlap on the rendering screen. The color and depth values are registered in pixel and depth buffers having storage locations corresponding to the pixels of the rendering screen. In this registration process, when more than one object pixel has been generated for a given rendering screen pixel, the depth values are compared to decide which of the object pixels is visible. Only the color and depth values corresponding to the smallest depth value, i.e., those of the visible object pixel, are stored in the pixel and depth buffers. This operation effectively removes hidden surfaces, i.e., surfaces that cannot be seen from the view point.
4. Display Phase: the contents of the pixel buffer are output for display after all polygons are processed by the geometry and rasterizing phases.

In the rasterizing phase, a shading operation calculates the color values for each object pixel. This step also calculates a set of intensity coefficients for each pixel and multiplies the original color values of the pixel by the respective intensity coefficients to obtain the pixel color values. The set of intensity coefficients also usually includes a red, a green and a blue intensity coefficient. The intensity coefficients define the effect of lighting, and depend on a material property of the polygon in which the object pixel is located, the color, position and direction of each light source, and the position and direction of the view point. Various methods already exist for calculating intensity coefficients. The polygon's original color is part of the graphic data defining the properties of the polygon. The original color of the polygon may be defined as a direct color or as a texture, as described above. When a direct color is used, the direct color itself is used as the original color. When a texture is mapped onto the polygon, the original color of each object pixel of the polygon is calculated from the pattern data representing the texture.

The pattern data of the texture defining the original color of each object pixel are determined as follows:

1. For each pixel coordinate (X, Y) of the rendering screen, associated texture coordinates (s, t) are calculated; and
2. A pixel color is accessed or interpolated from the pattern data of one or more texture pixels located at or near the texture coordinates (s, t).

In simplest implementations, a single set of the pattern data of the texture is adopted as the color values for each object pixel. Again, each set of the pattern data usually includes red, green and blue pattern data. However, this simple texture sampling method frequently produces objectionable block and moiré patterns. Texture filtering techniques are commonly used to calculate a set of single color values by interpolation among multiple ones of the pattern data representing the texture. For example, a so-called Multum in Parvo (MIP) map stores a texture image in a multi-resolution pyramidal data format. The set of color values defining the color of each object pixel is generated using two stages of interpolation. A first interpolation operation is performed on two levels between the pattern data in the same level, so-called intra-layer interpolation. Two intra-layer interpolation operations are performed, each of a different one of two adjacent levels, between the pattern data in the same level. Then, an inter-layer interpolation operation is performed between the results of the two intra-layer interpolation operations. The overall process is called tri-linear interpolation.

The conventional 3D-graphics rendering program requires that all texture data be received during the loading phase. However, not all textures produce visible results in the final rendered image. Textures on back-facing and clipped polygons are not processed in the rasterizing phase, and object pixels derived from textures applied to occluded polygons are not present in the final image because they are discarded during the hidden surface removal operation. The conventional technique of supplying the textures as bitmaps with a single, high resolution also prolongs the rendering time. This is because much of the bit map data necessary to generate a high-resolution texture may be redundant when the polygon onto which the texture is mapped is far from the view point or is at an oblique angle relative to the view point. In these cases, a lower resolution texture would suffice. Using the conventional 3D-graphics rendering program, it is impossible to decide which textures and the texture resolutions are necessary to render the image before the textures are loaded during the conventional Loading phase because no geometry has been calculated at this time. As a result, the conventional 3D-graphics rendering program requires that all textures be loaded, and be loaded in their highest resolutions, during the Loading phase.

The number of polygons typically affects the rendering time much more than the size of the textures. Therefore, applications typically try to reduce the computational power necessary to provide realistic and natural 3D images by reducing the number of polygons and increasing the use of textures. However, when this is done, the large number of texture data that results prolongs the loading time, especially in a network environment.

SUMMARY OF THE INVENTION

The invention provides a rendering apparatus that renders an image in response to three-dimensional graphics data. The rendering apparatus comprises an input path through which the rendering apparatus can receive the three-dimensional graphics data, a pixel/depth buffer, a reference buffer and a rendering engine. The three-dimensional graphics data include polygon data and additionally include texture data defining a texture. The texture data include texture size data and sets of pattern data. The pattern data in each of the sets represent the texture with a different resolution. The pattern data constitute a majority of the texture data. The pixel/depth buffer and the reference buffer include first memory cells and second memory cells, respectively, that correspond to the pixels of a rendering screen. The rendering engine performs an initial rasterizing operation using only the polygon and texture size data to generate and to store in the reference buffer, for each of the pixels of the rendering screen, a texture identifier, a layer depth value indicating a texture resolution, and texture coordinates. The rendering engine also identifies, in response to the texture identifier, the layer depth and the texture coordinates stored in the reference buffer for each of the rendering screen pixels, the ones of the pattern data required to render the image. The rendering engine acquires via the path those of the pattern data identified as being required to render the image. Finally, the rendering engine generates image data representing the image using the pattern data acquired via the path. The path has a data transfer rate substantially smaller than the data transfer rates between the rendering engine and the buffers.

The rendering apparatus may additionally comprise a texture memory in which the pattern data are stored in a pyramidal data structure. The pyramidal data structure includes layers in each of which are stored a respective one of the sets of the pattern data representing the texture with a different resolution. One of the sets of the pattern data represents the texture with a highest resolution.

The pattern data required to render the image may be acquired by loading the pattern data via the path or by synthesizing the pattern data from the pattern data of a set of the pattern data representing the texture with a higher resolution.

The layer depth value may be a real number having an integer part and a fractional part. When the fractional part of the layer depth value is zero, the rendering engine may perform a first intra-layer interpolation among the pattern data in a one of the sets of pattern data indicated by the integer part of the layer depth value to generate texture color values from which it derives the image data. However, when the fractional part of the layer depth value is non-zero, the rendering engine performs the first intra-layer interpolation, a second intra-layer interpolation among the pattern data in another of the sets having one level higher resolution than the one of the sets, and an inter-layer interpolation between results generated by the first and second intra-layer interpolations to generate the texture color values from which it derives the image data.

The invention also provides a method of rendering an image in response to three-dimensional graphics data. The image is represented by image data corresponding to pixels of a rendering screen. The three-dimensional graphics data include polygon data and additionally include texture data defining a texture. The texture data include texture size data and sets of pattern data. The pattern data in each of the sets represent the texture with a different resolution. The pattern data constitute a majority of the texture data. In the method, the polygon and texture size data are received. An initial rasterizing operation is performed for each one of the pixels of the rendering screen. The initial rasterizing operation is performed using the polygon and texture size data and generates and stores a texture identifier, a layer depth value indicating the texture resolution, and texture coordinates. A pattern data identifying operation is performed in response to the texture identifier, the layer depth and the texture coordinates stored for each one of the rendering screen pixels. The pattern data identifying operation identifies the ones of the pattern data required to render the image. A pattern data acquiring operation is then performed. This operation acquires the ones of the pattern data identified by the pattern data identifying operation as being required to render the image. A final rasterizing operation is then performed. In this, the image data representing the image are generated using the pattern data acquired by the pattern data acquiring operation.

This invention significantly reduces the time a user must wait before an image appears on the screen by providing a new processing apparatus and rendering method for generating an image in response to 3D graphics data. In the rendering apparatus and method according to the invention, the pattern data representing the textures are not acquired until after an initial first rasterizing operation has been completed. Pattern data are acquired by loading or by synthesizing from the pattern data of a higher-resolution layer of the pyramidal data structure. Performing the initial rasterizing operation before acquiring the pattern data means that only the pattern data defining the parts of the textures that are required to render the image at the necessary resolutions have to be acquired to render the image. In this way, the number of pattern data that have to be loaded from the server or synthesized is reduced, and so the waiting time is also reduced.

The rendering apparatus according to the invention includes a reference buffer that holds intermediate results generated by the initial rendering operation that is performed without pattern data. This enables pattern data acquisition and interpolation of the color values of the texture pixels to be deferred. By using the contents of the reference buffer, the invention enables the pattern data to be acquired efficiently, since only the required pattern data are loaded. The invention also provides two alternative methods of display, "best-resolution" and "progressive resolution," as will be described below.

DETAILED DESCRIPTION OF THE INVENTION

Figure 1:
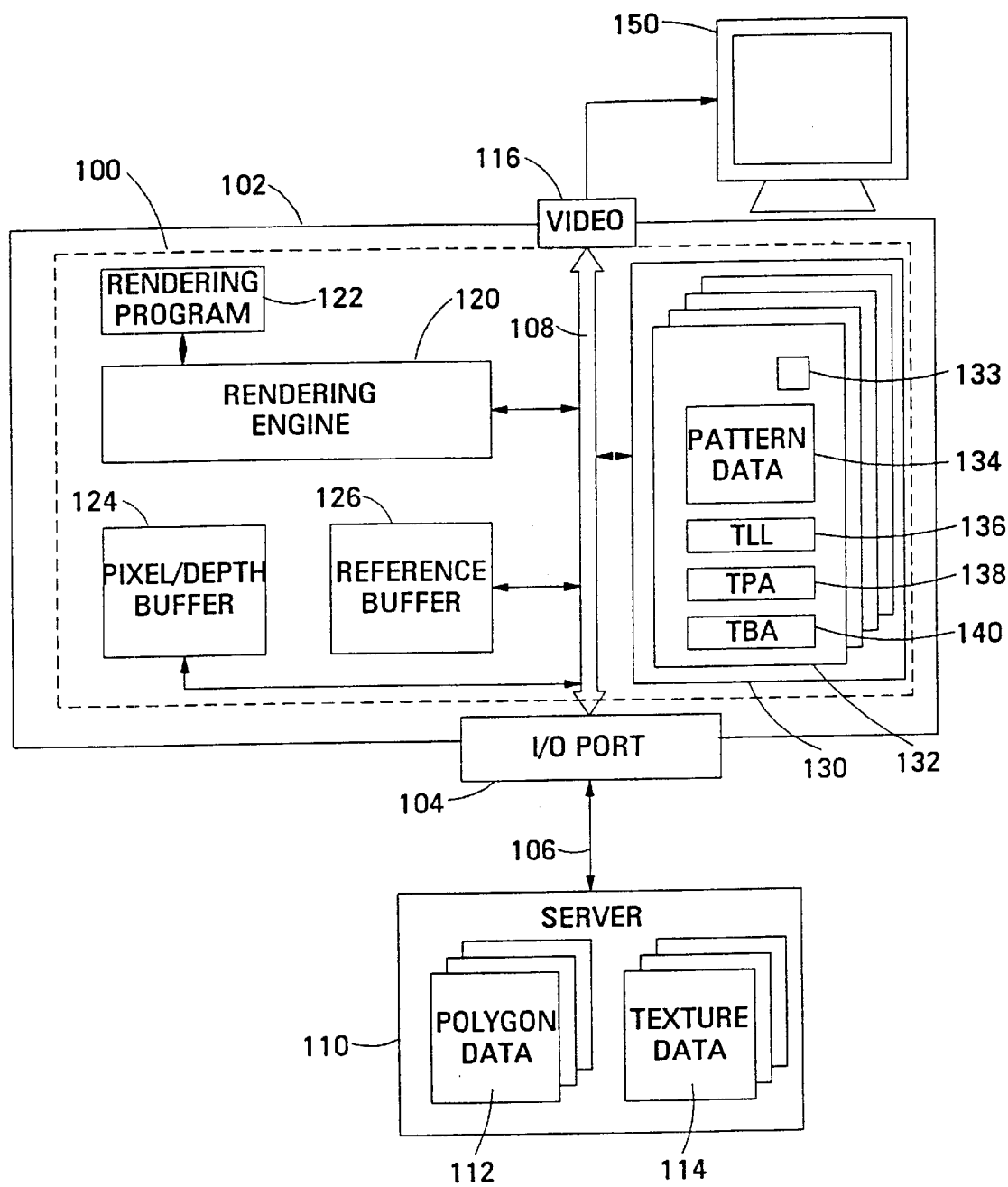
FIG. 1 is a block diagram of the structure of a 3D graphics rendering system that includes the rendering apparatus and practices the rendering method according to the invention.

The invention relates to an image rendering apparatus and method intended for use in an environment in which the data transfer rate is limited, as in a network such as the Internet. FIG. 1 is a block diagram of the rendering apparatus 100 according to the invention. The rendering apparatus resides in the computer 102, for example. In a practical embodiment, the rendering apparatus may form part of a graphics card (not shown) located in the computer. Alternatively, the rendering apparatus may be a hardware accessory that plugs into or is otherwise connected to the graphics card of the computer.

The computer 102 is shown connected via the I/O port 104 as a client of the network 106. The I/O port is connected directly or indirectly to the bus 108 to which other elements of the rendering apparatus and the computer are connected. The network, I/O port and bus constitute a path through which the rendering apparatus receives three-dimensional graphics data including texture data defining one or more textures.

Also shown connected to the bus 108 is the video output port 116 through which the final color values of the rendering screen pixels generated by the rendering apparatus 100 are fed to the monitor 150 for display.

Also connected to the network 106 is the server 110 that includes the memories 112 and 114 that collectively store 3D graphics data. The memory 112 stores polygon data that define the topology of the surfaces of the objects in the 3D graphic. The memory 114 stores texture data that define the textures applied to one or more of the surfaces. Pattern data defining the appearance of the texture constitute a significant majority of the texture data. The texture data also include such data as texture height and width data.

Additionally or alternatively, the 3D graphics data may be stored in the computer 102. In this case, storage sections equivalent to the memories 112 and 114 are located in a memory (not shown), such as hard disk, located in the computer and connected directly or indirectly to the bus 108. For example, 3D graphics loaded from the server 110 may be cached on the computer's hard disk. In this case, the hard disk and the bus constitute the path through which the rendering apparatus receives the three-dimensional graphics data, including texture data defining one or more textures.

In the rendering apparatus 100, the rendering engine 120 is connected to the bus 108. The rendering engine executes the rendering program 122 to perform a rendering operation in response to the 3D graphics data. The rendering operation generates a set of pixel data specifying a two-dimensional image. The rendering engine performs the method according to the invention. The rendering engine may be constructed using a microprocessor, a digital signal processor, one or more application-specific integrated circuits or general-purpose integrated circuits and may include other elements such as read-only and random-access memories that enable it to perform the processing described herein.

The rendering apparatus 100 additionally includes the pixel/depth buffer 124 and the reference buffer 126. The pixel/depth buffer and the reference buffer are connected to the rendering engine 120, either directly, via the bus 108 or by some other arrangement. The data transfer rate between the rendering engine and the buffers is substantially greater than the rate at which the three-dimensional graphics data are received via the path, i.e., from the network 106 or from the computer's hard drive.

The pixel/depth buffer 124 and the reference buffer 126 are preferably each composed of multi-byte storage cells. Preferably, each of the cells corresponds to one pixel of the rendering screen. During each rendering operation performed by the rendering engine 120, the pixel/depth buffer functions sequentially first as a depth buffer and second as a pixel buffer. Typically, a conventional rendering apparatus also includes a depth buffer and a pixel buffer, but the conventional apparatus uses the buffers simultaneously when it performs hidden surface removal operations, so cannot use a single buffer for both functions. In the rendering apparatus according to the invention, the depth buffer and the pixel buffer need not be used simultaneously, so that the functions of both buffers can be performed by a single portion of physical memory. The rendering apparatus 100 according to the invention uses the reference buffer 126 to store intermediate results generated by the texture calculations, as will be described in detail below.

The rendering apparatus 100 also includes the texture data memory 130 connected to the bus 108. The texture data memory is partitioned into multiple pages, an exemplary one of which is shown at 132. The texture data of one texture is stored in each of the pages. Each page of the texture data memory is divided into sections in which subsets of the texture data representing the texture are stored. In the example shown in FIG. 1, the page 132 includes maximum layer depth memory 133, the pyramidal pattern data store 134, the tile load list 136, the tile pitch array 138 and the tile base array 140.

Pattern data representing the texture are stored in the pyramidal pattern data store 134 in a multi-resolution pyramidal data structure that will be described in detail below. The tile load list 136 includes an entry for each tile into which the texture is divided, as will be described below. The entry indicates the acquisition status of the pattern data of the tile, i.e., whether the pattern data of the tile have been acquired or not, and whether such pattern data need to be acquired. The tile pitch array 138 and the tile base array 140 each include an entry for each layer of the pyramidal data structure. The entry in the tile pitch array indicates the number of tiles in each row of the layer. The entry in the tile base array indicates the tile number of the top, left-hand tile of the layer. The tile base array may include an additional entry in which the total number of tiles is stored. The texture data stored in each page of the texture memory will be described in more detail below.

Figure 2:
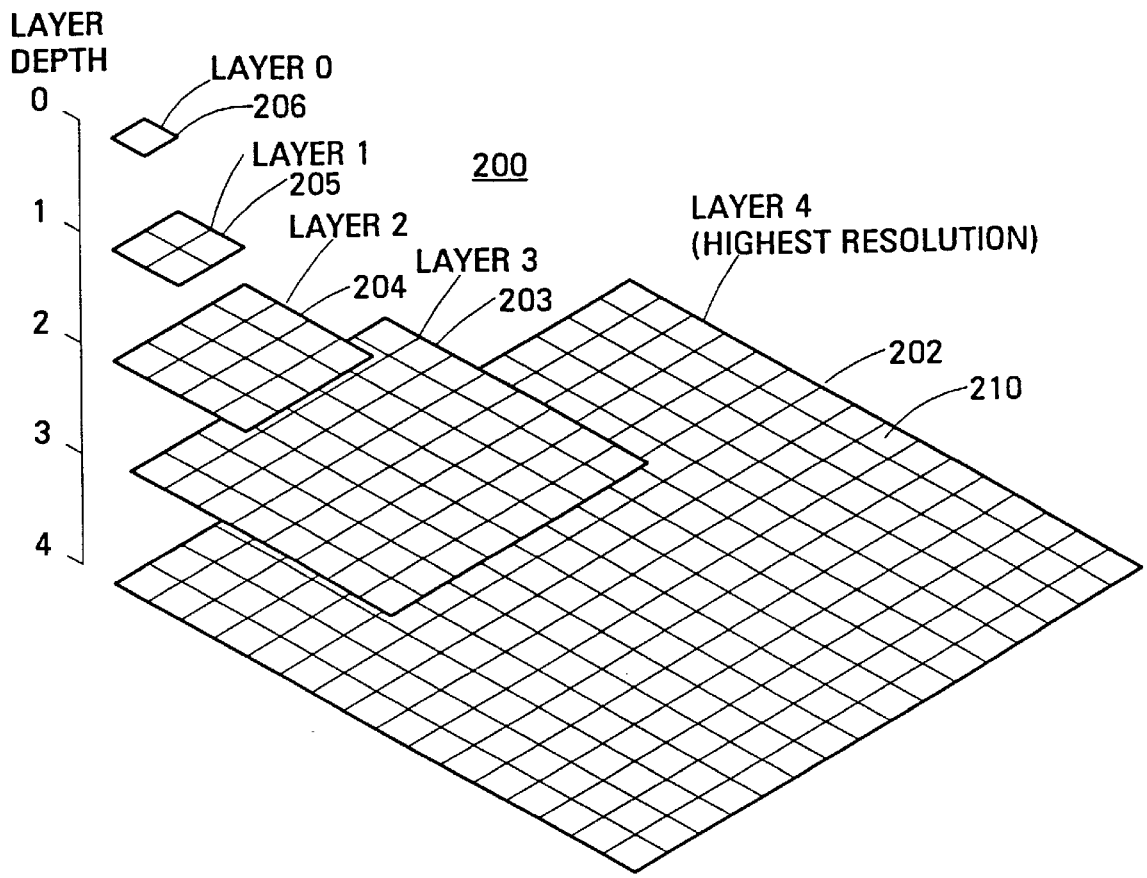
FIG. 2 illustrates the multi-resolution pyramidal data structure used to store the pattern data of the textures in the rendering apparatus and method according to the invention.

FIG. 2 shows the structure of the multi-resolution pyramidal data structure 200 in which the pattern data representing each texture are stored. The multi-resolution pyramidal data structure is based on the conventional two-dimensional graphics system sold under the trademark FLASHPIX. This two-dimensional graphics system uses a multi-resolution pyramidal data structure to store data representing two-dimensional images such as photographs and the like. In the rendering apparatus and method according to the invention, the pattern data of each texture are stored in a pyramidal data structure in which sets of pattern data, each representing the texture with a different resolution, are arranged in a number of layers. The layers are numbered from the top layer down, the top layer being layer zero. The position of a layer in the pyramidal structure is described by the layer depth of the layer. The top layer, in which the lowest-resolution pattern data are stored, has a layer depth of zero. The layer depth of the layer in which the highest-resolution pattern data are stored in the example shown in FIG. 2 is four. However, the pyramidal data structure may include more or fewer layers than the number shown in this example.

The pattern data in each of the layers of the pyramidal data structure 200 represent the texture at a resolution of one-half of the resolution at which the pattern data in the layer below represent the texture, and twice the resolution at which the pattern data in the layer above represent the texture.

The pattern data that represent the texture at its highest resolution constitute the bottom layer 202 of the pyramidal data structure 200. Normally, the highest resolution is the same as the original resolution of the texture. However, if the original resolution is higher than the maximum resolution needed for the application, the highest resolution may be less than the original resolution. The pattern data of four adjacent pixels in the bottom layer are combined to generate the pattern data of one pixel in the layer 203 immediately above the bottom layer. Consequently, the pattern data in the layer 203 represent the texture with a linear resolution in each direction of one-half that of the pattern data of the bottom layer. The number of pattern data in the layer 203 is one-quarter of the number of pattern data in the bottom layer 202. The combining process described above is performed to generate the pattern data in each of the remaining layers 204–206 from the pattern data in the layer immediately below.

In the top layer 206 of the pyramidal data structure 200, the texture is represented by the pattern data of an array of a pixels horizontally and b pixels vertically. In the preferred embodiment, a=b=64. It should be noted that the pyramidal data structure 200 differs from a conventional pyramidal data structure such as the MIP data structure. In the pyramidal data structure 200, the pattern data of one tile are stored in the top layer. In a conventional pyramidal data structure, the pattern data of one pixel are stored in the top layer.

Each of the layers of the pyramidal data structure 200 below the top layer 206 can be divided into tiles, each composed of an array of a×b pixels. An exemplary tile is shown at 210. The tile is the unit in which the pattern data are acquired. The pattern data are loaded in units of tiles from the server 110 and may additionally or alternatively be transferred from a memory (not shown) located in the client computer 102, as described above. Each layer of the pyramidal data structure 200 is divided into $4^D$ tiles, where D is the layer depth of the layer and the top layer 206 has a layer depth of 0.

The pattern data in each of the layers normally constitute an image map representing the texture. However, when the pattern data are transferred to the rendering apparatus through the network 106, for example, the image map data may be compressed to reduce the transmission time. For example, JPEG compression may be used to compress the image map data to generate the pattern data for transmission. However, the compressed pattern data are expanded to bit-map form before being stored in the pyramidal data structure.

Pattern data are stored in each of the layers 202–206 of the pyramidal data structure 200. The layers 202–206 each have a layer depth D that is an integer, i.e., 0, 1, 2, . . . , n. However, when the rendering engine 120 calculates the optimum resolution of the texture to be applied to a given object pixel, as will be described in more detail below, the layer depth generated by this calculation is a real number, i.e., the layer depth can have a fractional portion in addition to an integral portion. Such a layer depth does not coincide with the physical layers of the pyramidal data structure. In this case, the rendering engine 120 calculates pattern data for a layer having a non-integral layer depth. Such pattern data are calculated by interpolation among the pattern data stored in the layer having an integral layer depth $D_L$ equal to the integral part of the layer depth D and the pattern data stored in the layer having an integral layer depth of $D_G=D_L+1$. For example, the rendering engine will calculate the pattern data for a layer having a layer depth of 2.3 by interpolation among the pattern data of the layers having layer depths of 2 and 3.

Figure 3A:
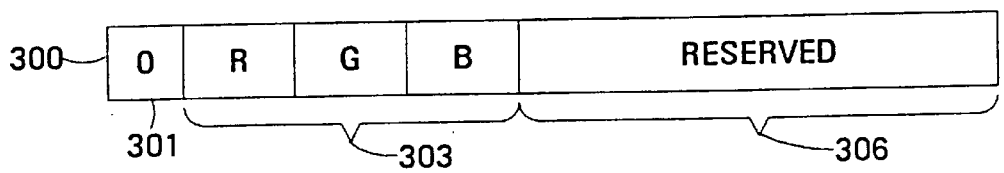
FIGS. 3A and 3B show the data structure of a cell of the reference buffer corresponding to one pixel of the rendering screen when the color values of the pixel are calculated directly and using texture color values, respectively.
Figure 3B:
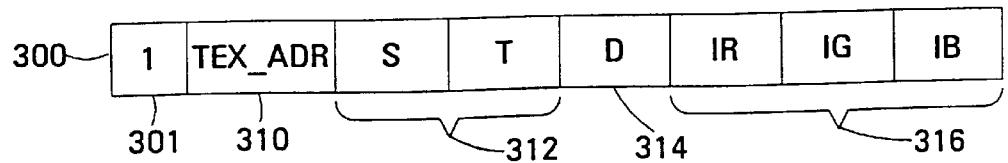

As noted above, the reference buffer 126 stores the results of an initial rasterizing operation performed for each pixel of the rendering screen. The results are used later when a final rasterizing operation is performed. The reference buffer may be embodied in a portion of memory, such as random-access memory. The memory is partitioned into cells each corresponding to one of the pixels of the rendering screen. FIGS. 3A and 3B depict examples of the two alternative data structures that are used in the cells of the reference buffer 126 to store the results of the initial rasterizing operation. The results of the initial rasterizing operation stored in the cell may be direct color data or texture data. The type of the data stored in the cell is indicated by the state of the bit stored in the first field 301 of the cell. FIG. 3A shows an example of the data structure of the cell when the initial rasterizing operation generates direct color data. FIG. 3B shows an example of the data structure of the cell when the initial rasterizing operation generates texture coordinates and intensity coefficients.

In the initial rasterizing operation, when the rendering screen pixel is derived from an object pixel that lies in a polygon to which no texture is to be applied, final color values for the rendering screen pixel are obtained by multiplying the direct color of the polygon by its intensity coefficients, as described above. In this case, a 0 is stored in the first field 301 to indicate that the initial rasterizing operation has generated direct color data. The final color values resulting from the multiplication is typically composed of a red color value, a green color value and a blue color value. The red, green and blue color values are stored in R, G and B sections, respectively, of field 302 of the pixel's cell, using the data structure shown in FIG. 3A. The remainder 306 of the memory allocated to the cell 300 is reserved so that the same size cell can be used when the rendering screen pixel is derived from an object pixel located in a polygon to which a texture is to be applied, and the data structure is that shown in FIG. 3B.

When the rendering screen pixel is derived from an object pixel located in a polygon to which a texture is to be applied, a 1 is stored in the first field 301 of the cell 300, as shown in FIG. 3B. The data stored in the remaining fields of the cell are as follows: the field 310 stores a pointer or index that indicates the page of the texture memory 130 shown in FIG. 1 in which the texture data of the texture to be applied to the pixel are stored. The field 312 stores the texture coordinates (S, T) expressed in terms of pixels of the bottom (highest resolution) layer 202 of the pyramidal data structure shown in FIG. 2. The texture coordinates are calculated by applying the polygon's projection matrix and a texture mapping matrix or function (s, t) to the coordinates (X, Y) of the object pixel:

$S=s(X,Y)$ $T=t(X,Y)$

The field 314 stores the layer depth D that defines the layer of the pyramid data structure shown in FIG. 2 from which pattern data will be taken for use in calculating the final color values of the rendering screen pixel. The layer depth D is calculated using the following equation:

$$D = D_{max} - \log_2\left\{\max\left(\sqrt{\left(\frac{\partial S}{\partial X}\right)^2+\left(\frac{\partial T}{\partial X}\right)^2}, \sqrt{\left(\frac{\partial S}{\partial Y}\right)^2+\left(\frac{\partial T}{\partial Y}\right)^2}\right)\right\}$$

in which $D_{max}$ is the layer depth of the bottom layer 202 of the pyramidal data structure 200 shown in FIG. 2.

Finally, the field 316 stores the intensity coefficients of the pixel. In this example, red, green and blue intensity coefficients are respectively stored in the sections IR, IB and IB of the field.

In conventional 3D graphics rendering, the texture coordinates (S, T), and the layer depth D are calculated in real numbers. Intra-layer and inter-layer interpolations are then immediately performed using the calculated parameters to generate the final color values of each rendering screen pixel. However, in the rendering apparatus and method according to the invention, the texture coordinates (S, T), and the layer depth D are calculated during the initial rasterizing operation. The initial rasterizing operation is performed before any of the pattern data are loaded. The results of the initial rasterizing operation are stored in the reference buffer for use when the final color values are calculated during the final rasterizing operation. This is performed only after the required pattern data have been acquired.

The method according to the invention and operation of the rendering apparatus according to the invention will now be described with reference to FIGS. 1, 2, 3, 4A and 4B. It should be noted that, initially, only a small fraction of the texture data are loaded from the server. Acquiring the pattern data that constitute the significant majority of the texture data is deferred until after the initial rasterizing operation has been completed. The following description refers to an example in which the 3D graphics data are stored in the server 110 and are loaded via the network 106. Similar operations are performed when the 3D graphics data are cached in the computer 102.

Figure 4A:
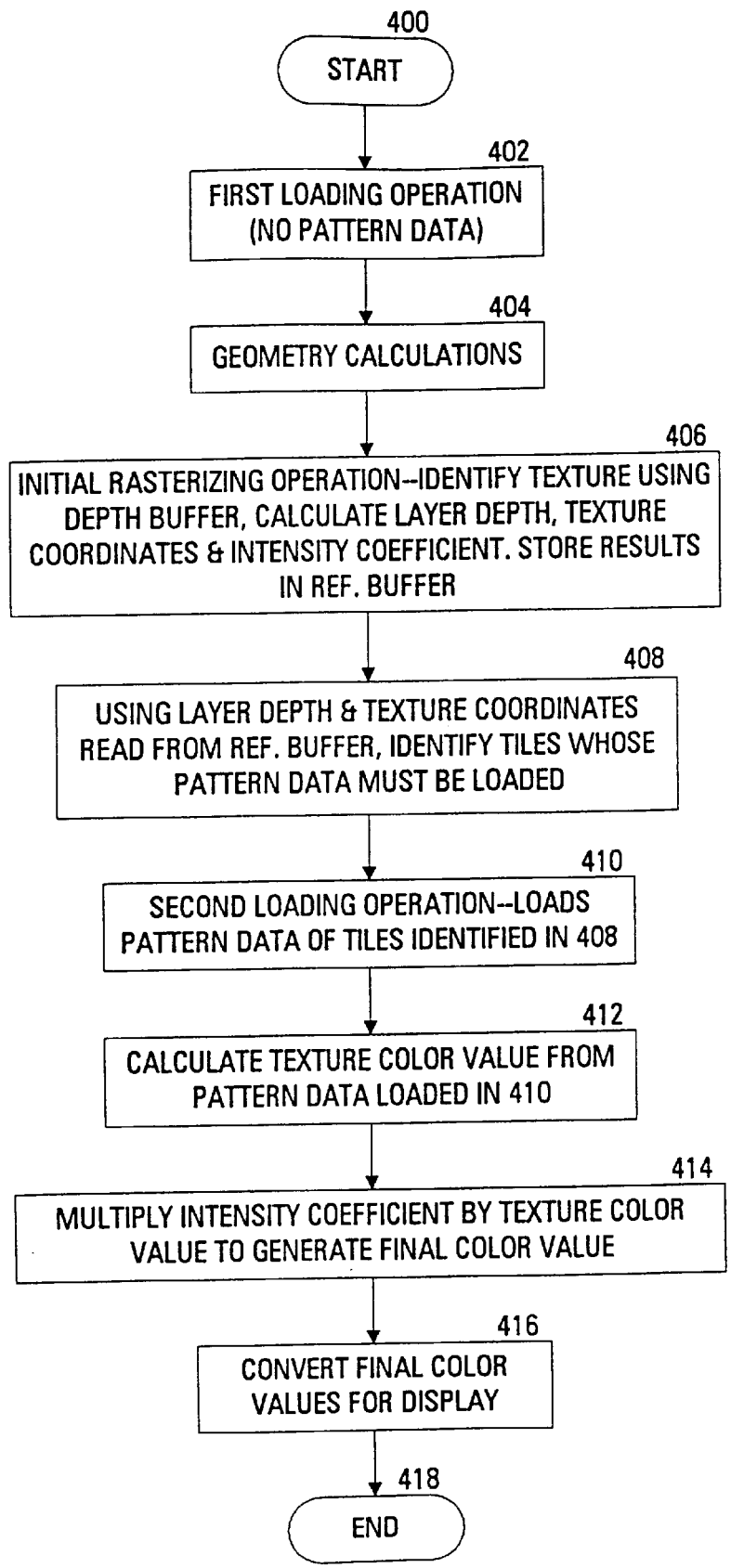
FIG. 4A is a flow diagram illustrating the image rendering method according to the invention.

First, an overview of the method and operation of the rendering apparatus will be described with reference to the flow chart shown in FIG. 4A. To simplify the following explanation, only the processing that is applied to the pixels of the rendering screen to which a texture is to be applied will be described. Processing begins in step 400.

In step 402, a first loading operation is performed. In this, the polygon data and the width and height values of each of the textures are loaded from the server. The width and height values of each texture constitute a small fraction of the texture data of the texture. Moreover, the number of polygon data is relatively low. Accordingly, a short time is required to perform this step.

In step 404, geometry calculations are performed.

In step 406, an initial rasterizing operation is performed. The initial rasterizing operation differs from a conventional rasterizing operation in that it is performed without the pattern data for the textures. The initial rasterizing operation includes a hidden surface removal operation that uses the pixel/depth buffer 124 as a depth buffer. The hidden surface removal operation identifies the texture that will be applied to each pixel of the rendering screen. A pointer indicating the page of the texture memory 130 where the texture data of the identified texture will be stored is stored in the pixel's cell in the reference buffer 126. Also calculated in this step for each pixel of the rendering screen are the layer depth D and the texture coordinates (S, T) of the texture identified by the hidden surface removal operation, and the intensity coefficients of the rendering screen pixel. The layer depth, the texture coordinates and the intensity coefficients are also stored in the pixel's cell in the reference buffer.

In step 408, the texture coordinates and the layer depths stored in the reference buffer 126 are used to identify the tiles of the pyramidal data structure whose pattern data must be acquired to render the image.

In step 410, a second loading operation is performed. In this, the pattern data of only those tiles identified in step 408 are acquired. The pattern data are acquired either by loading them from the server or by synthesizing them from the pattern data of the layer immediately below, i.e., the next-higher resolution layer. Normally, the pattern data of only a fraction of the tiles constituting a layer are acquired. Moreover, because the pattern data of the lower-resolution layers can be synthesized if the necessary pattern data in the next-higher resolution layer have been acquired, the fraction of the tiles of the lower-resolution layers whose pattern data are acquired by loading may be smaller than the fraction of tiles of the higher-resolution layers whose pattern data are acquired by loading. Since fewer than all of the pattern data are normally loaded, this step executes considerably faster than the conventional loading phase.

In steps 412 and 414, a final rasterizing operation is performed. In step 412, a set of texture color values is calculated for each pixel of the rendering screen by interpolation from the pattern data for the texture tiles acquired in step 410.

In step 412, the texture color values for each pixel are multiplied by the pixel's intensity coefficients read from the reference buffer 126 and the resulting final color values for the pixel are stored in the pixel/depth buffer 124. The intensity coefficients were calculated during the initial rasterizing operation.

In step 414, the final color values for the pixels of the rendering screen are converted into a signal suitable for displaying on the monitor 150.

In step 416, execution ends.

The method and operation of the rendering apparatus according to the invention will now be described in greater detail with reference to FIGS. 1, 2, 3 and 4B. Execution begins at step 450.

In steps 451 and 452, a first loading operation is performed. In this, no pattern data are loaded.

In step 451, the polygon mesh data are loaded from the memory 112 in the server 110. The polygon mesh data include data specifying the textures applied to the surfaces of the polygons.

In step 452, the width and height values of each texture specified by the polygon mesh data are loaded from the memory 114 of the server 110. The width and height values of the textures constitute the small fraction of the texture data referred to above. No pattern data, which constitute the majority of the texture data, are loaded at this time. Also in this step, a texture initialization operation is performed in response to the width and height values for each of the textures specified by the polygon mesh data. In this initialization operation, the width and height values are used to calculate the number of layers ($D_{max}+1$) that the multi-resolution pyramidal data structure shown in FIG. 2 will use to store the pattern data of the texture when the pattern data are eventually acquired. Also calculated, or read from a look-up table, are the number of tiles in the rows of each layer of the pyramidal data structure, and the tile number of the top, left-hand tile of each layer.

The value of $D_{max}$ is stored at 133 of the texture's page 132 of the texture memory 130. The initialization operation also uses the results generated by the layer calculation described above and the texture height and width values to set up the pyramidal data structure 134, the tile load list 136, the tile pitch array 138 and the tile base array 140 for each texture in the texture's page of the texture memory.

The tile load list 136 includes an entry for each tile in the pyramidal data structure 134. The entry stores a two-bit code that represents the acquisition status of the tile. The loading status of a tile has three states that will be represented in this disclosure by the letters N, L and E. The loading status in a practical rendering apparatus is represented by the above-mentioned two-bit code. The texture initialization operation sets the entry for each tile to "N," which indicates that the pattern data for the tile are not present in the pyramidal data structure for the texture. Later, the operation that identifies the tiles whose pattern data must be acquired sets the entries in the tile loading list for such tiles to "L," which indicates that the pattern data for the tile must be acquired in the second loading operation referred to above. The second loading operation sets the entries in the tile loading list for those of the tiles whose pattern data have been acquired and stored in the pyramidal data structure to "E," which indicates that pattern data for the tile exist in the pyramidal data structure and can be used for rendering the image.

The tile pitch array 138 and the tile base array 140 each include an entry for each layer of the pyramidal data structure 134. The entry in the tile pitch array 138 stores the tile pitch of the layer. The tile pitch is the number of tiles in the rows of the layer. The entry in the tile base array 140 stores the tile base of the layer. The tile base is the tile number of the top, left-hand tile of the layer.

When the texture is defined by the pattern data of texture pixels arrayed in a square whose dimension in terms of pixels is a power of two, e.g., 512×512 pixels, the values of the tile pitch in the layers of the pyramidal data structure 200 starting at the top (lowest resolution) layer 206 are 1, 4, 16, . . . , $4^D$, where D is the layer depth of the layer, the top layer having a layer depth of 0. The corresponding values of the tile base are: 0, 1, 5, 21, . . . , $$\sum_{k=0}^{D} 4^k - 1,$$

where k is an index.

When the texture is defined by the pattern data of texture pixels arrayed in an array whose dimensions are not powers of two, more complicated calculations are required to generate the tile pitch and tile base. Such calculations, when required, are performed in step 452. Note that at the completion of step 452, no pattern data have yet been acquired for the textures.

In step 453, a conventional Geometry phase operation is performed. In this, the projections of the polygons onto the rendering screen are calculated.

In step 454, the initial rasterizing operation is performed. In this, the projections of the polygons onto the rendering screen calculated in step 453 are converted into object pixels and a depth calculation is performed for each object pixel for use in hidden surface removal. The depth calculations preferably use the pixel/depth buffer 124 for registering the depth value of the object pixels. Alternatively, a depth buffer independent of the pixel buffer may be used. When object pixels overlap, only the object pixel having the smallest depth value is registered in the buffer, so that hidden surface removal is performed.

The depth calculations define the object pixel corresponding to each pixel of the rendering screen. For the rendering screen pixels corresponding to object pixels located in a polygon to which a texture is to be applied, the field 301 of the pixel's cell 300 in the reference buffer 126 is set to 1 and the address of the page of the texture memory 130 in which the texture data for the texture are stored is entered into field 310 of the cell. For the rendering screen pixels corresponding to object pixels located in a polygon whose color will be determined by a direct color calculation, the field 301 of the pixel's cell 300 in the reference buffer 126 is set to 0.

For the rendering screen pixel corresponding to each object pixel located in a polygon to which no texture is to be applied, as indicated by a 0 in the field 301 of the rendering screen pixel's cell 300 in the reference buffer 126, a conventional shading calculation is performed. The shading calculation generates a set of color values for the pixel. The red, green and blue color values in the set of color values are stored in the R, G and B sections, respectively, of the field 302 of the pixel's cell in the reference buffer.

For the rendering screen pixel corresponding to each object pixel located in a polygon to which a texture is to be applied, as indicated by a 1 in the field 301 of the rendering screen pixel's cell 300 in the reference buffer 126, a partial shading calculation is performed. The partial shading calculation generates values for the texture coordinates (S, T), the layer depth D, and the intensity coefficients for the pixel. The texture coordinates are stored in the field 312, the layer depth is stored in the field 314, and the red, green and blue intensity coefficients are stored in the sections IR, IG and IB, respectively, of the field 316 of the pixel's cell in the reference buffer.

The invention provides two display modes, namely, a best resolution display mode and a progressive resolution display mode. The best resolution display mode minimizes the total loading time of the pattern data. The progressive resolution display mode displays an image more quickly than the best resolution display mode. However, in the progressive resolution display mode, the textures are first displayed with a low resolution and are subsequently displayed with progressively-increasing resolutions until each texture is displayed with optimum resolution. The display mode may be selected by the user (not shown) or may be defined by the 3D graphics program.

At step 455, a test is performed to determine whether the best resolution display mode has been selected. If the test result is YES, execution advances to step 461 where processing for the best resolution display mode begins. If the test result is NO, execution advances to step 471 where processing for the progressive resolution display mode begins. The processing for the best resolution display mode will described next and the processing for the progressive resolution display mode will be described below.

Figure 5A:
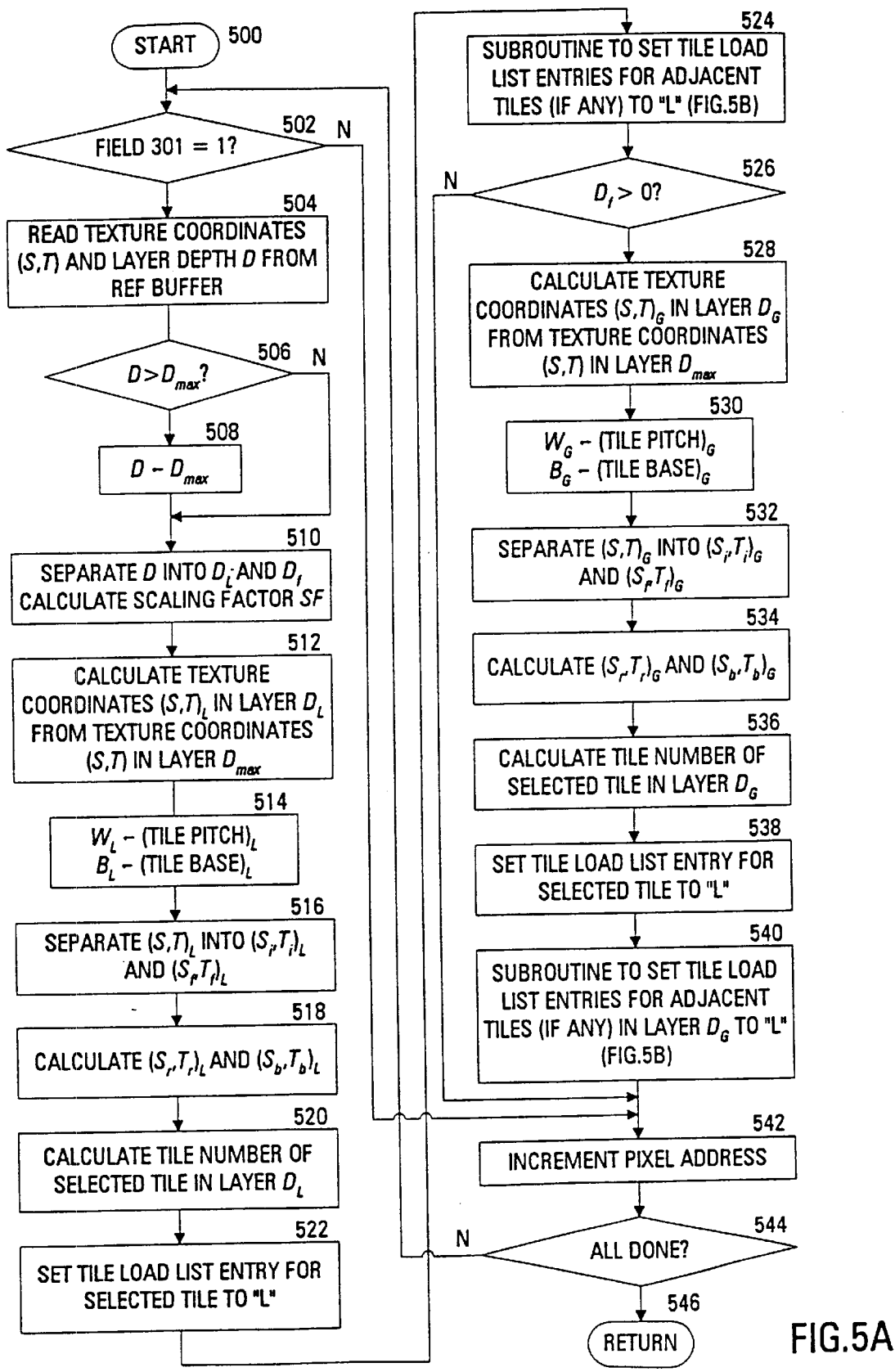
FIG. 5A is a flow diagram of a subroutine for indicating the tiles whose pattern data must be acquired by loading or synthesis to render the image.
Figure 5B:
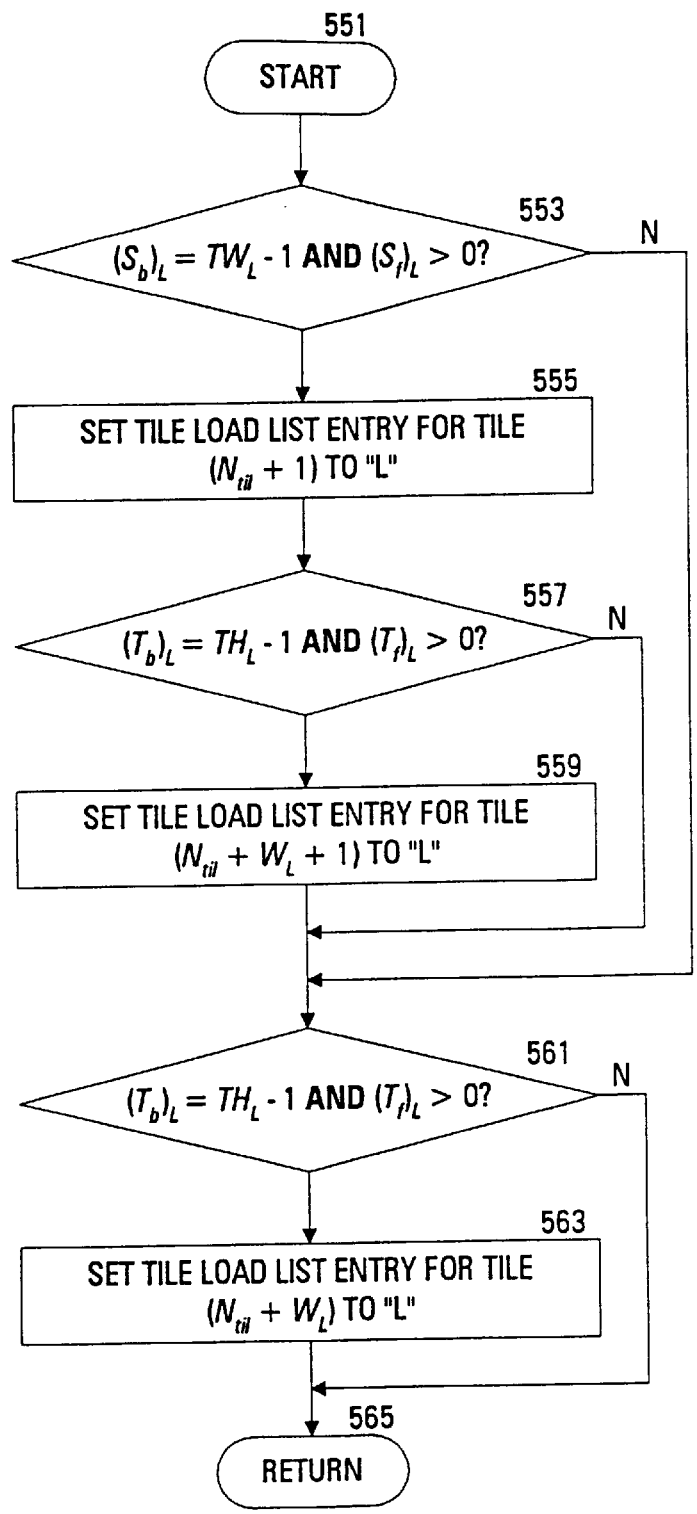
FIG. 5B is a flow diagram of a subroutine for determining whether a texture pixel lies on the boundary of a tile and, if so, for indicating additional tiles whose pattern data must be acquired.

In step 461, the routine that will be described in detail below with reference to FIGS. 5A and 5B is performed for each pixel of the rendering screen having a 1 in field 301 of the pixel's cell 300 in the reference buffer 126. A 1 in this field indicates that the object pixel corresponding to the rendering screen pixel was located in a polygon to which a texture is to be applied. The routine identifies, for each texture, the tiles of the texture's pyramidal data structure 134 whose pattern data must be acquired in the second loading operation to enable the image to be rendered. When execution of step 461 is complete, all of the tiles of each texture's pyramidal data structure whose pattern data must be acquired are identified, and the entries for these tiles in the texture's tile load list 136 are all set to "L."

In step 462, the second loading operation is performed by executing the routine that will be described in detail below with reference to FIG. 6 for each texture for which a page 132 exists in the texture memory 130. The routine scans the tile load list 136 stored in the texture's page 132 of the texture data memory 130 and acquires the pattern data for the tiles whose tile load list entries are set to "L." As noted above, the pattern data for each tile may be acquired by loading or by synthesis from the pattern data in the next-higher resolution, i.e., the layer immediately below in the pyramidal data structure. When execution of step 462 is complete, all of the pattern data required to render the image are stored in the pyramidal data structures in the respective pages of the texture memory, and the entries for these tiles in the corresponding tile load lists are all set to "E."

It should be noted that, on completion of step 462, a substantial number of the entries in the tile load lists may remain set to "N." Such entries indicate that pattern data for the corresponding tiles have not been acquired because such pattern data are not needed to render the image. This allows step 462 to execute more quickly than the conventional Loading phase.

In step 463, the final rendering operation is performed by executing the routine that will be described in detail below with reference to FIG. 7A for each pixel of the rendering screen having a 1 in field 301 of the pixel's cell 300 of the reference buffer 126. The routine performs tri-linear interpolations to complete the partial shading operation initially performed in step 454. The interpolations calculate a set of texture color values for the pixel from the pattern data acquired in step 462. The tri-linear interpolations are performed using pattern data located in two layers of the pyramidal data structure. The two layers bracket the real-number layer depth stored in field 314 of the pixel's cell 300 of the reference buffer 126. The routine then multiplies the texture color values by the respective intensity coefficients stored in the field 316 of the rendering screen pixel's cell of the reference buffer in step 454 to generate the final color values for the pixel. The final color values are stored in the pixel's location of the pixel buffer. In the preferred embodiment, the pixel/depth buffer 124 is used as the pixel buffer. Alternatively, a pixel buffer independent of the depth buffer may be used.

In step 464, for each pixel of the rendering screen having a 0 in field 301 of the pixel's cell 300 in the reference buffer 126, the final color values stored in field 302 of the pixel's cell of the reference buffer are copied to the pixel's location in the pixel buffer.

Finally, in step 465, the final color values stored in the pixel buffer 124 are output directly or indirectly to the monitor 150. The monitor displays the rendered image in response to the final color values received from the pixel buffer.

Execution then advances to step 481 where a test is performed to determine whether the user (not shown) has entered an input. For example, the user input may enter an input that changes the point of view. This requires that a new rendering operation be performed. If the test result is NO, execution returns to step 481. If the test result is YES, execution advances to step 482 where the parameters affected by the user input are changed. Execution then returns to step 453 and a new rendering operation is performed. During the new rendering operation, the pattern data of tiles whose pattern data were not previously acquired may need to be acquired, but much of the pattern data acquired in the rendering operation just described can usually be re-used.

The processing performed in the progressive resolution display mode will now be described with reference to FIG. 4B. In step 471, the pattern data of the top tiles of all of the textures specified by the polygon data loaded in step 451 are loaded from the server 110. The pattern data of the top tile of each of the textures are stored in appropriate location in the pyramidal data structure 134 in the texture's page 132 of the texture memory 130. The pattern data of the top tiles represent the respective textures with the lowest resolution. Then, the processing performs a resolution improvement loop in which the image is displayed initially with low-resolution textures, and then with progressively higher-resolution textures as the pattern data of higher-resolution tiles are acquired. The resolution improvement loop is composed of steps 472–477.

Figure 7A:
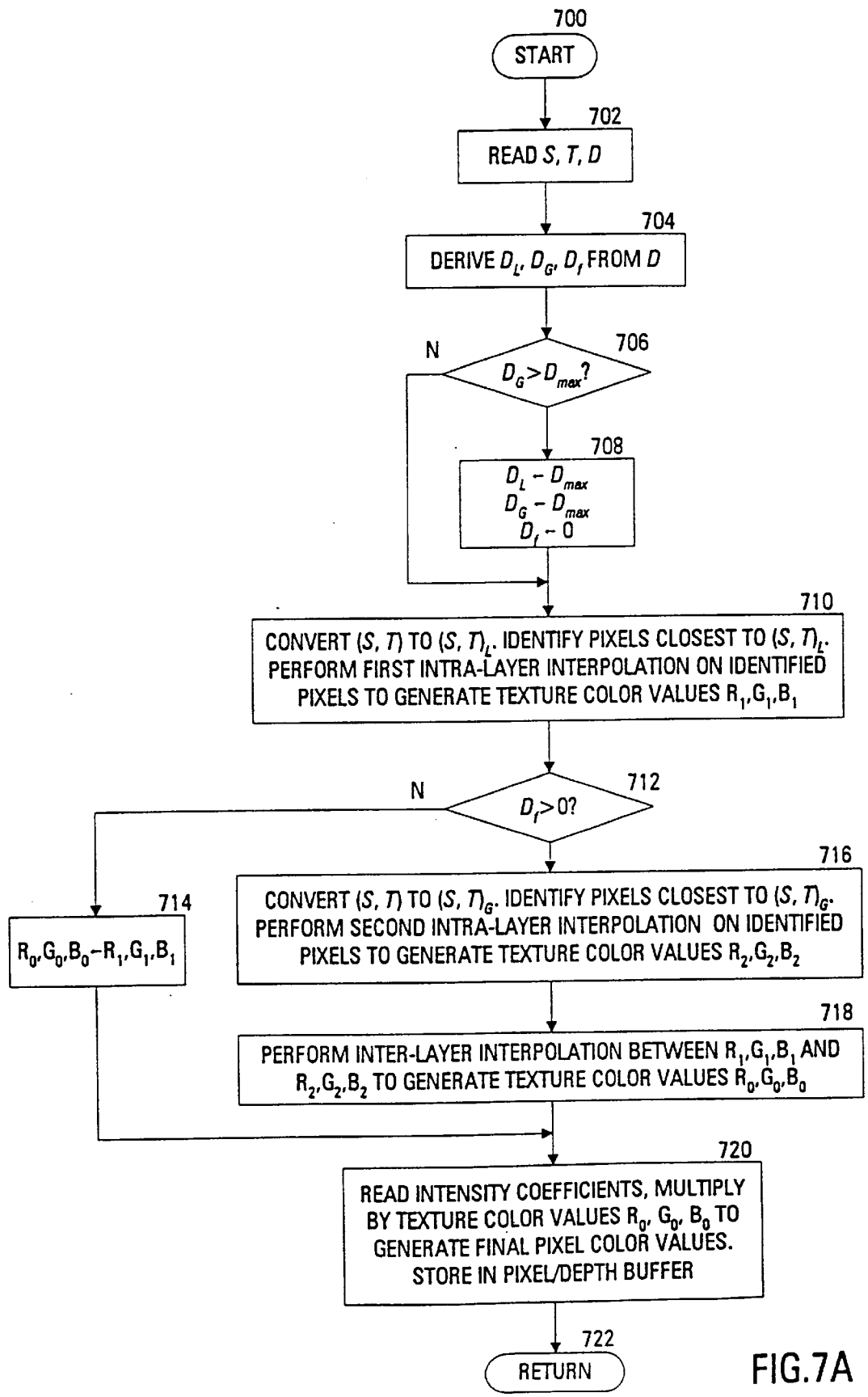
FIG. 7A is a flow diagram of a subroutine for interpolating texture color values and generating the final color values of the pixels of the rendering screen in the best resolution display mode.
Figure 7B:
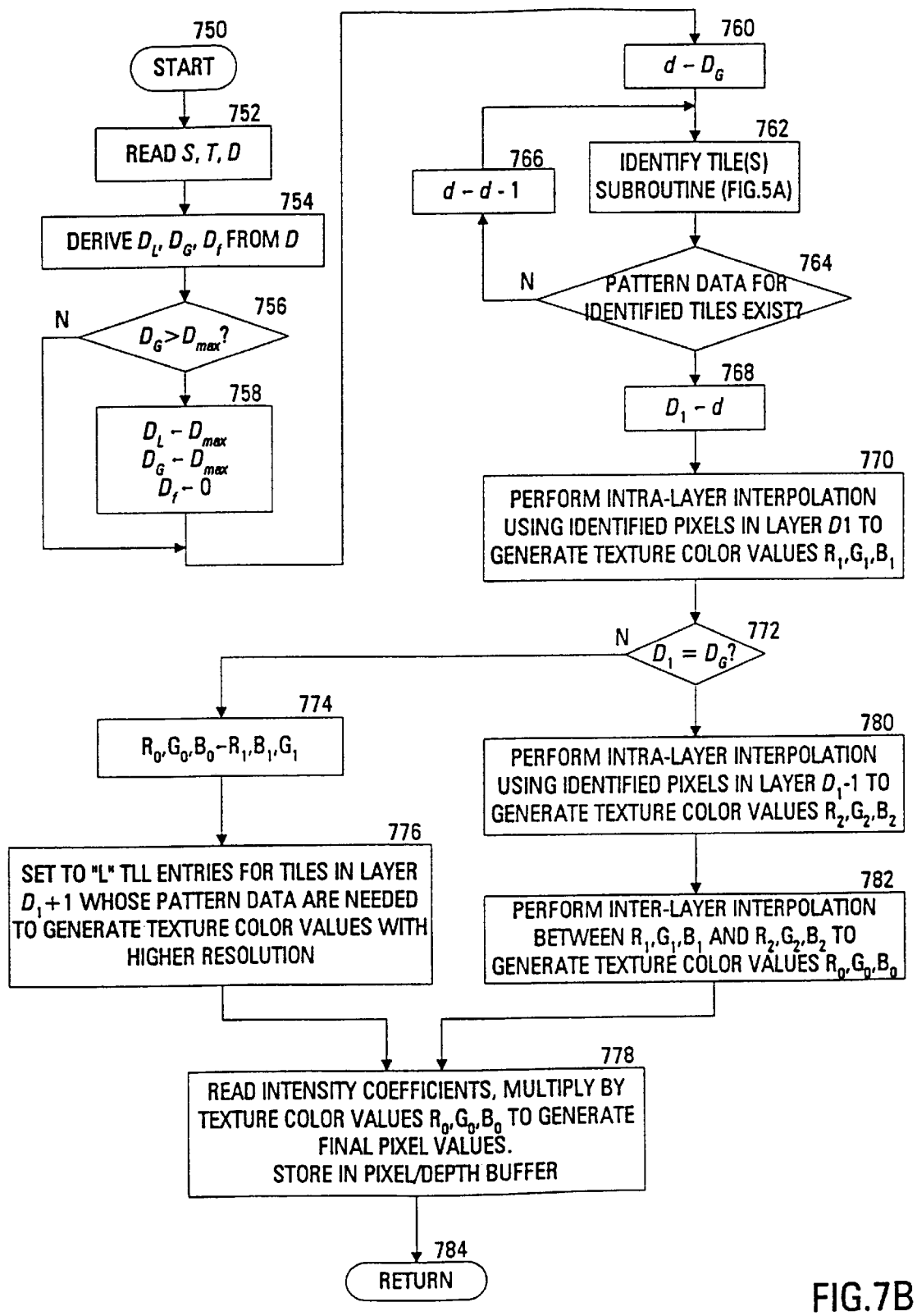
FIG. 7B is a flow diagram of a subroutine for interpolating texture color values and generating the final color values of the pixels of the rendering screen in the progressive resolution display mode.

In step 472, the routine that will be described in detail below with reference to FIG. 7B is performed for each pixel of the rendering screen having a 1 in field 301 of the pixel's cell 300 of the reference buffer 126. The routine uses bi-linear and tri-linear interpolation to generate texture color values for the textures. The texture color values are multiplied by the intensity coefficients stored in the reference buffer 126 and the resulting final color values for the rendering screen pixels are stored in the pixel/depth buffer 124. The pixel/depth buffer is used as a pixel buffer in this operation. Alternatively, a pixel buffer independent of the depth buffer may be used.

In early iterations of the loop, most of the texture color values that are calculated are interim values having less than optimum resolution. However, the early iterations may calculate some of the texture color values with optimum resolution. As the number of iterations increases, the number of rendering screen pixels for which the texture color values are calculated with optimum resolution increases. As the resolution of the texture color values increases, the resolution with which the textures are displayed in the image also increases.

The processing to be described below with reference to FIG. 7B also sets the tile load list entries of certain tiles to "L." Such entries indicate the tiles whose pattern data must be acquired when step 477 is performed later in the routine. Acquiring these pattern data increases the resolution of the texture color values generated when the step 472 is performed in the next iteration of the loop.

In step 473, for each pixel of the rendering screen having a 0 in field 301 of the pixel's reference buffer cell 300, the final color values stored in field 302 of the pixel's reference buffer cell are copied to the pixel's location in the pixel buffer 124.

In step 474, the final color values for the pixels of the rendering screen stored in the pixel buffer 124 are output directly or indirectly to the monitor 150. The monitor displays an image in response to the final color values. Execution then advances to step 476 via step 475. Step 475 will be described below.

In step 476, a test is performed on the tile load lists 136 stored in the pages 132 of the texture memory 130 to determine whether any of the entries in the tile load lists were set to "L" when step 472 was executed. If the result is NO, indicating that all the pattern data required to render the image with best resolution have been acquired, processing advances to step 481, described above. If the result is YES, execution advances to step 477.

In step 477, the second loading operation is performed by executing the routine that will be described in detail below with reference to FIG. 6 for each texture for which a page 132 exists in the texture memory 130. The routine scans the tile load list 136 stored in the texture's page 132 of the texture data memory 130 and acquires the pattern data for the tiles whose tile load list entries are set to "L." As noted above, the pattern data for each tile may be acquired by loading or by synthesis from the pattern data in the next-higher resolution layer, i.e., the layer immediately below in the pyramidal data structure. When execution of step 477 is complete, the entries in the tile load lists for the tiles whose pattern data were acquired are set to "E." Execution then returns to step 472.

Each time step 477 is executed, pattern data having a resolution greater than the previously-acquired pattern data are acquired. This enables the final color values of a finer-grained, better resolution image to be generated the next time step 472 is executed. The loop composed of steps 472–477 is repeated until the pattern data of the tiles required to generate the same image as that provided by the best resolution display mode have been acquired. A NO result is obtained in the test performed at step 476 when the pattern data of the tiles that provide such an image have been acquired.

The loop composed of steps 472 to 477 includes the pattern data acquisition step 477, and so can take a long time to execute, especially when the higher-resolution pattern data are loaded. Therefore, step 475 is included in the loop. This step allows the user to interrupt the resolution improvement loop to input new parameters. The new parameters may be a change in the point of view, for example. In step 475, a test is performed to determine whether a user input has been received. If the result is NO, indicating that no user input has been received, execution advances to step 476, the next step of the resolution improvement loop. If the result is YES, the resolution improvement loop stops executing, and execution advances to step 482 where the new user parameters are received. Execution then returns to step 453 where the rendering process is repeated in response to the new user input.

FIG. 5A shows details of the routine performed in step 461 to identify the tiles of the pyramidal data structure 200 for which pattern data must be acquired to enable the image to be rendered in the best resolution display mode. The routine shown in FIG. 5A is performed for each pixel of the rendering screen, but begins with testing the contents of the field 301 of the pixel's reference buffer cell 300. If the field contains a 0, indicating that the pixel's final color values were calculated in step 454, the rest of the routine is not performed. Thus, in effect, the routine is fully performed only on those pixels derived from object pixels that were located in a polygon to which a texture is to be applied.

Execution starts at step 500. At step 502, a test is performed to determine whether a 1 is stored in the field 301 of the pixel's reference buffer cell 300. A 1 in the field 301 indicates that rendering screen pixel corresponds to an object pixel located in a polygon to which a texture is to be applied. When the test result is NO, execution advances to step 542 where the pixel address is incremented so that the next rendering screen pixel can be processed. When the test result YES, execution advances to step 504.

In step 504, the values of the texture coordinates (S, T) and the layer depth D are read from the fields 312 and 314 of the rendering screen pixel's cell 300 in the reference buffer 126. All of the quantities read are real numbers that can be represented as floating-point or fixed-point quantities.

At step 506, a test is performed to determine whether the value of D read in step 504 is larger than the value of $D_{max}$ for the texture. The value of $D_{max}$ is read from the section 133 of the page 132 of the texture memory 130 indicated by the address stored in field 310 of the cell 300. A value of D greater than $D_{max}$ indicates that the maximum resolution of the pattern data is insufficient to provide the desired texture resolution in the rendered image. In this case, D is set to the maximum available resolution, i.e., $D_{max}$. If the test result is YES, execution advances to step 508, where D is set to $D_{max}$, and then to step 510. If the test result is NO, execution advances directly to step 510.

In step 510, the layer depth D read in step 504 is separated into its integer part $D_L$ and its fractional part $D_f$. Additionally, the value of the scaling factor $SF=D_{max}-D_L$ is calculated.

In step 512, the texture coordinates (S, T) in the layer $D_{max}$ are divided by $2^{SF}$ to obtain the texture coordinates (S, T)$_L$ in the layer $D_L$.

In step 514, the values of the tile pitch and the tile base for the layer $D_F$ are respectively read from the tile pitch array 138 and tile base array 140 of the texture's page 132 of the texture memory 130 and are assigned to the variables $W_L$ and $B_L$. The texture's page in the texture memory is indicated by the address stored in the field 310 of the pixel's cell 300 in the reference buffer 126.

In step 516, the texture coordinates (S, T)$_L$ are separated into integer parts (S$_i$, T$_i$)$_L$ and fractional parts (S$_f$, T$_f$)$_L$.

In step 518, the integer parts (S$_i$, T$_i$)$_L$ of the texture coordinates in the layer $D_L$ are respectively divided by TW$_L$ and TH$_L$ to generate the quotients (S$_r$, T$_r$)$_L$. In this, TW$_L$ and TH$_L$ are respectively the width and height in pixels of the tiles in the layer $D_L$. The remainders of the divisions (S$_b$, T$_b$)$_L$ are also calculated for use in the subroutine performed in step 524 and for use in calculating local coordinates for application to the tile that will be identified in step 520.

In step 520, the tile number of the tile $N_{til}$ in the layer $D_L$ to which the pattern data required to render the image belongs is calculated from the tile base $B_L$, the tile pitch $W_L$ for the layer and the quotients calculated in step 518. The tile number $N_{til}$ is obtained by summing the tile base $B_L$, the quotient (S$_r$)$_L$ and the product of the quotient (T$_r$)$_L$ and the tile pitch $W_L$, i.e., $N_{til}=B_L+((T_r)_L \times W_L)+(S_r)_L$.

In step 522, the entry for the tile $N_{til}$ identified in step 520 in the tile load list 136 in the page 130 of the texture memory 130 is set to "L" to indicate that the pattern data of this tile must be acquired to render the image. The page of the texture memory is indicated by the address stored in the field 310 of the pixel's cell 300 in the reference buffer 126.

When the texture coordinates (S, T)$_L$ define a point on the border between the tile identified in step 520 and one or more adjacent tiles, the entries in the tile load list for the adjacent tiles must additionally be set to "L" to indicate that the pattern data of these tiles must also be acquired. In step 524, the sub-routine that will be described in detail below with reference to FIG. 5B is performed using the remainders (S$_b$, T$_b$)$_L$ and fractional parts (S$_f$, T$_f$)$_L$ obtained in steps 518 and 516, respectively. The subroutine checks whether the coordinates (S, T)$_L$ define a point on the border between the tile identified in step 520 and one or more adjacent tiles and, if necessary, sets the tile load list entries for the additional tiles to "L" so that the pattern data of these tiles will also be acquired. After completion of the subroutine, execution advances to step 526.

If the value of D stored in the field 314 of the pixel's cell 300 in the reference buffer 126 is an integer, the texture color values for the rendering screen pixel can be determined by interpolation using the pattern data in the layer $D_L$ only. If, as is usually the case, the value of D has a non-zero fractional portion, tri-linear interpolation is preferably employed to generate the texture color values. Tri-linear interpolation additionally requires pattern data of the next-higher resolution layer $D_G$. The layer $D_G$ has a layer depth one greater than that of the layer $D_L$, i.e., $D_G=D_L+1$. The rest of the routine shown in FIG. 5A identifies the at least one of the tiles in the higher-resolution layer $D_G$ whose pattern data must be acquired to render the image.

In step 526, a test is performed to determine whether the value of $D_f$ obtained in step 510 is greater than zero, i.e., whether the value of D is an integer. If the test result is NO, execution advances to step 542 where the rendering screen pixel address is incremented, as described above. If the test result is YES, steps 528 to 540 are performed to set to "L" the tile load list entries of one or more tiles in the layer $D_G$ immediately below the layer $D_L$ in which the linear resolution is twice of that of the layer $D_L$. The pattern data of the one or more tiles identified in the next-lower layer $D_G$ will be acquired for use in inter-layer interpolation.

In step 528, the texture coordinates (S, T)$_L$ are multiplied by two to obtain the texture coordinates (S, T)$_G$ in the layer $D_G$.

Steps 530–540 are substantially similar to steps 514–524 except that the quantities used in steps 530–540 and the quantities calculated in steps 530–540 pertain to the layer $D_G$ instead of to the layer $D_L$. In step 538, the entry in the tile load list 136 for the identified tile $N_{til}$ in the layer $D_G$ is set to "L," indicating that the pattern data of this tile must be acquired to render the image. The tile load list is stored in the page 132 of the texture memory 130 indicated by the address stored in the field 310 of the pixel's cell 300 in the reference buffer 126. Additional tiles in layer $D_G$ may be marked in the subroutine performed in step 540. After completion of the subroutine, execution advances to step 542.

In step 542, the pixel address is incremented. In step 544, a test is performed to determine whether all the pixels in the rendering screen have been processed. If the result is YES, execution advances to step 546, where it returns to the main routine shown in FIG. 4B. If the test result is NO, execution returns to step 502.

FIG. 5B shows details of the subroutine performed in step 524 of the procedure shown in FIG. 5A. The subroutine determines whether the texture coordinates (S, T)$_L$ define a point on the border between the tile identified in step 520 and one or more adjacent tiles, and, if so, marks the entries of the adjacent tiles in the tile load list. The subroutine is performed at step 540 is similar but is applied to the texture coordinates $(S, T)_G$.

Execution starts at step 551.

At step 553, tests are performed to determine whether the texture coordinates $(S, T)_L$ define a point on a vertical edge of the tile identified in step 520. Such a point is on the border of the identified tile and a tile adjacent in the horizontal direction. A test is performed to determine whether the remainder $(S_b)_L$ generated in step 518 is equal to $TW_L-1$ and a test is performed to determine whether the fractional part $(S_f)_L$ of the coordinate $S_L$ generated in step 516 is greater than zero. If the result of either test is NO, execution passes to step 561. If the result of both tests is YES, indicating that the point defined by the coordinates $(S, T)_L$ is on a vertical edge of the identified tile, execution passes to step 555.

In step 555, the entry in the tile load list for the tile with tile number $N_{til}+1$ is set to "L." Execution then passes to step 557.

At step 557, tests are performed to determine whether the coordinates $(S, T)_L$ define a point on a corner of the tile identified in step 520. Such a point is on the border of the identified tile and tiles adjacent in the both the horizontal and vertical directions. A test is performed to determine whether the remainder $(T_b)_L$ generated in step 518 is equal to $TH_L-1$ and a test is performed to determine whether the fractional part $(T_f)_L$ of the coordinate $T_L$ generated in step 516 is greater than zero. If the result of either test is NO, execution passes to step 561. If the result of both tests is YES, indicating that the point defined by the coordinates $(S, T)_L$ is on a corner of the identified tile, execution passes to step 559.

In step 559, the entry in the tile load list for the tile with tile number $N_{til}+W_L+1$ is set to "L." Execution then passes to step 561.

At step 561, tests are performed to determine whether the coordinates $(S, T)_L$ define a point on a horizontal edge of the tile identified in step 520. Such a point is on the border between the identified tile and a tile adjacent in the vertical direction. The testing performed is the same as that performed in step 557, i.e., a test determines whether the remainder $(T_b)_L$ generated in step 518 is equal to $TH_L-1$ and a test determines whether the fractional part $(T_f)_L$ of the coordinate $T_L$ generated in step 516 is greater than zero. If the result of either test is NO, execution passes to step 565, where it returns to the main routine. If the result of both tests is YES, indicating that the point defined by the coordinates $(S, T)_L$ is on a horizontal edge of the identified tile, execution passes to step 563.

In step 563, the entry in the tile load list for the tile with tile number $N_{til}+W_L$ is set to "L." Execution then passes to step 565, whence it returns to the main routine.

Figure 4B:
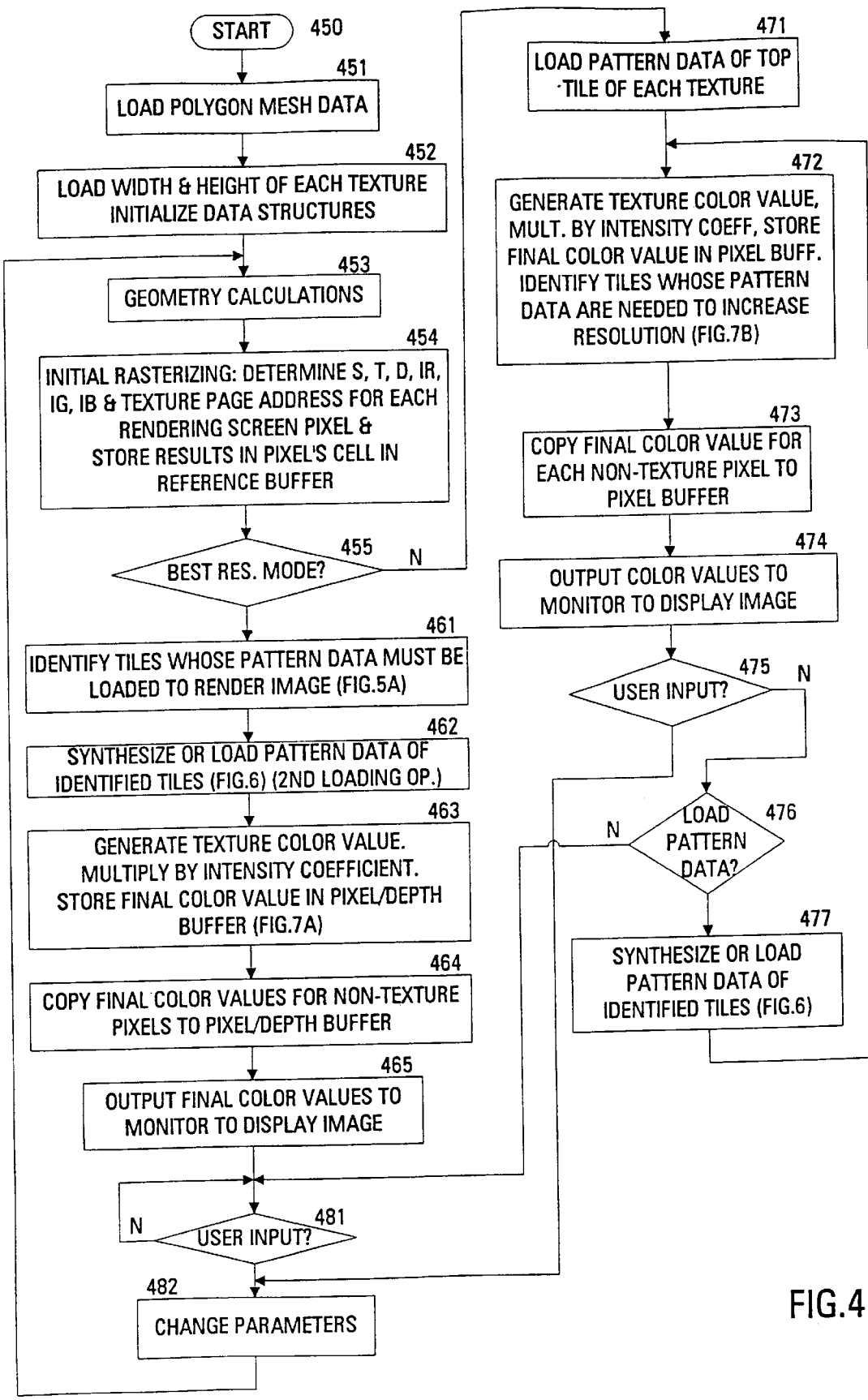
FIG. 4B is a flow diagram showing the image rendering method according to the invention in more detail.
Figure 6:
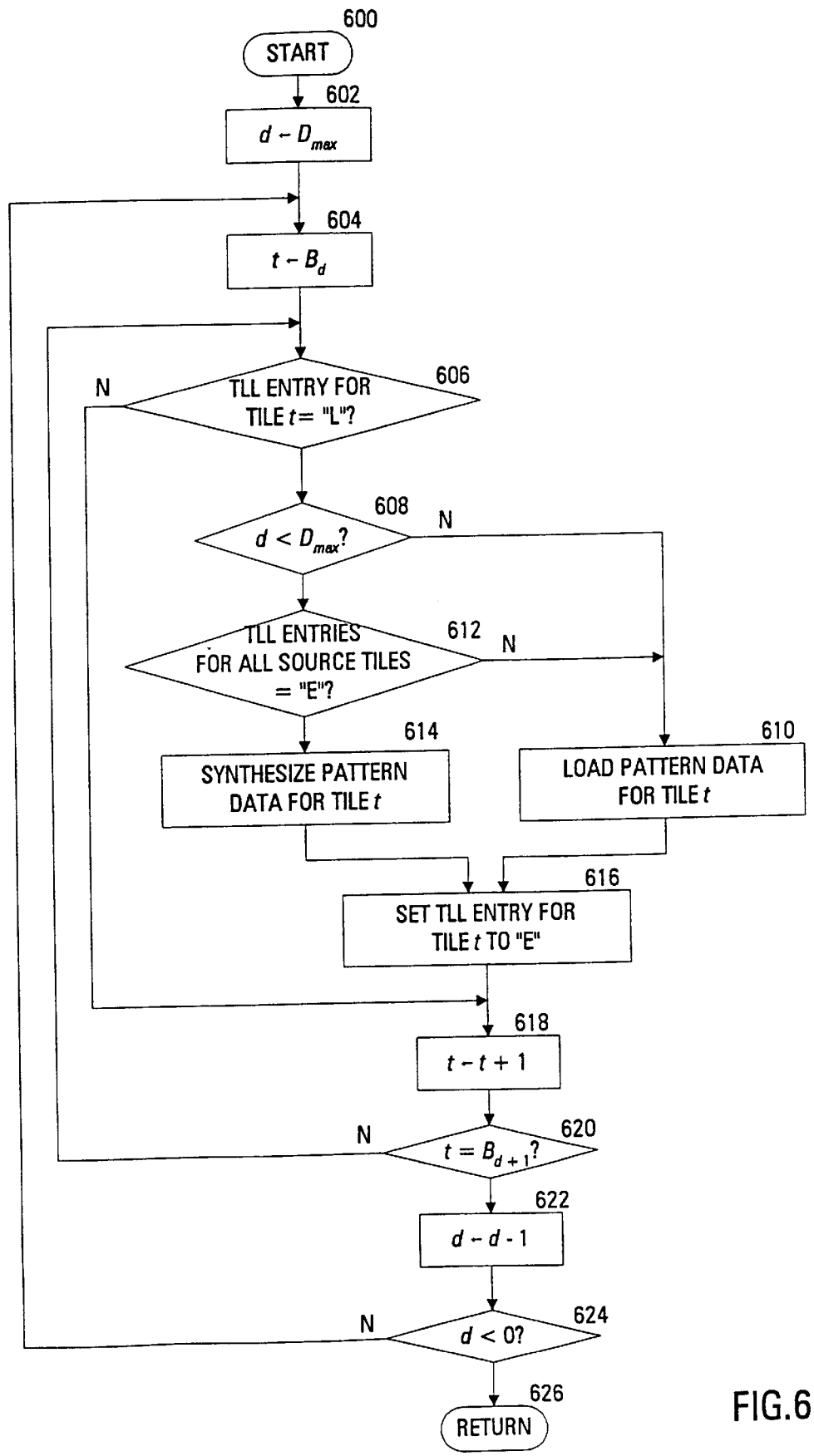
FIG. 6 is a flow diagram of a subroutine for acquiring the pattern data of the tiles indicated by the routine shown in FIG. 5A.

FIG. 6 is a detailed flow diagram of an example of a routine that can be used to perform step 462 of the routine shown in FIG. 4B. The routine tests the tile load list 136 stored in each page 132 of the texture data memory 130, acquires the pattern data for the tiles whose tile load list entries are set to "L," and sets the tile load list entries for the tiles whose pattern data have been acquired to "E." The pattern data are acquired by synthesis or by loading. The routine is performed for each of the textures for which texture data are stored in a page 132 of the texture data memory 130. After step 461 of the routine shown in FIG. 4B has been performed for each cell in the reference buffer 126, the entry in the tile load list for each of the tiles whose pattern data must be acquired to render the image is set to "L."

Execution starts at step 600. Portions of the tile load list corresponding to the layers of the pyramidal data structure shown in FIG. 2 are tested, starting with the portion corresponding to the bottom layer in which the texture resolution is the highest. In the following explanation, the layer corresponding to the tile load list portion being tested will be called the current layer. The layer with a layer depth one less than that of the current layer will be called the next-higher layer. The layer with a layer depth one greater than that of the current layer will be called the next-lower layer.

In step 602, the value of the layer depth index d is set to $D_{max}$, the layer depth of the bottom (highest resolution) layer.

In step 604, the tile index t is set to $B_d$, the value of the tile base for the current layer.

In step 606, a test is performed to determine whether the entry in the tile load list (abbreviated as TLL in the figures) for the tile having the tile index t is set to "L." If the test result is NO, indicating that the pattern data for the tile do not have to be acquired, execution advances to step 618. If the test result is YES, execution advances to step 608.

In step 608, a test is performed to determine whether the layer depth index d indicating the current layer is less than the layer depth $D_{max}$ of the bottom layer 202 of the pyramidal data structure 200 shown in FIG. 2. Pattern data stored in the bottom layer cannot be synthesized since there are no higher-resolution pattern data available from which to synthesize the pattern data of the bottom layer. Thus, if the test result is NO, indicating that the current layer is the bottom layer, execution advances to step 610 where the pattern data for the tile having the tile index t are loaded and stored in the location indicated by the tile index in the pyramidal data structure 134 in the texture's page 132 of the texture memory 130. Execution then advances to step 616, which will be described below.

If the test result in step 608 is YES, execution passes to step 612. A test result of YES indicates that the current layer is higher than the bottom layer, so the possibility exists that the pattern data for the tile in the current layer can be synthesized from the pattern data of source tiles located in the next-lower layer, i.e., higher resolution layer, whose layer depth is d+1. Synthesizing the pattern data is usually preferable to loading the pattern data because pattern data can be synthesized faster than they can be loaded.

In step 612, a test is performed to determine whether the entries in the tile load list for the source tiles of the tile with tile index t are all set to "E." The source tiles are tiles located in the next-lower layer whose pattern data can be used to synthesize the pattern data of the tile in the current layer. Such synthesis can be performed only if the pattern data of all the required source tiles exist in the pyramidal data structure, as indicated by "E" in the tile load list entries for all the source tiles. The pattern data of four source tiles in the next-lower layer are required to synthesize the pattern data of most tiles in the current layer. However, the pattern data of only two source tiles are required to synthesize the pattern data of tiles located at the right-hand and bottom borders of the current layer. Moreover, the pattern data of only one source tile is used as the pattern data of the tile located at the bottom, right-hand corner of the current layer.

If the test result in step 612 is NO, indicating that insufficient pattern data exist in the next-lower layer to synthesize the tile with tile index t in the current layer, execution advances to step 610. In step 610, the pattern data of the tile with tile index t is loaded as described above. If the test result is YES, execution advances to step 614.

In step 614, the pattern data of the tile with tile index t in the current layer are synthesized from the pattern data of the source tiles in the next-lower layer. The synthesized pattern data are stored in the location indicated by the tile index in the pyramidal data structure 134 in the texture's page 132 of the texture memory 130. Execution then advances to step 616.

In step 616, the entry in the tile load list for the tile with tile index t is set to "E," which indicates that the tile's pattern data now exist in the texture's pyramidal data structure as a result of their being acquired by synthesis in step 614 or by loading in step 610.

In step 618, the tile index is incremented.

In step 620, a test is performed to determine whether the tile load list entries of all of the tiles in the current layer have been tested. This is done by testing whether the value of the tile index is greater than $B_{d+1}$, the value of the tile base of the next-lower layer. When the current layer is the bottom (highest resolution) layer, the value of the total number of tiles stored in the tile base array is used as the tile base of the (non-existent) layer below the bottom layer. If the test result is NO, execution returns to step 606 so that the tile load list entry of another tile in the current layer can be tested. If the test result is YES, indicating that all possible pattern data for the current layer have been acquired, execution advances to step 622.

In step 622, the layer depth index d is decremented by one.

In step 624, a test is performed to determine whether the layer depth d of the current layer is less than zero, the layer depth of the top (lowest resolution) layer. If the test result is NO, execution returns to step 604 so that the pattern data of the next-higher layer can be acquired. If the test result is YES, indicating that the pattern data of all the tiles whose tile load list entries are set to "L" have been acquired, execution advances to step 626, whence it returns to the routine shown in FIG. 4B.

FIG. 7A shows details of the routine executed in step 463 of the main routine shown in FIG. 4B to generate the final color values for the rendering screen pixels in the best resolution display mode. This routine is executed for each pixel of the rendering screen having a 1 in the field 301 of the pixel's reference buffer cell 300. A 1 in this field indicates that the rendering screen pixel corresponds to an object pixel located in a polygon to which a texture is to be applied. The final color values of each rendering screen pixel are obtained by multiplying the intensity coefficients calculated in step 454 by the texture color values obtained by tri-linear interpolation from the pattern data acquired in step 462. Execution begins at step 700.

In step 702, the routine accesses the pixel's cell 300 in the reference buffer 126 and reads the texture coordinates S, T and the layer depth D. These parameters are all real numbers.

In step 704, the layer depths of the two layers of the pyramidal data structure that will be used to perform the inter-layer interpolation to obtain the texture color values for the layer depth having the value of D read in step 702 are determined. As noted above, the layers bracket the layer depth D. The layer depth D is separated into its integer part $D_L$ and its fractional part $D_f$. In addition, $D_L$ is incremented by one to obtain $D_G$ (=$D_L$+1). The higher-resolution of the two layers is the layer whose layer depth is $D_G$. The lower-resolution of the two layers is the layer whose layer depth is $D_L$.

In step 706, a test is performed to determine whether $D_G$ is greater than the maximum layer depth $D_{max}$. If the test result is NO, execution advances to step 710. If the test result is YES, execution advances to step 708, where both $D_L$ and $D_G$ are set to $D_{max}$, and the fractional part $D_f$ is set to zero. Execution then advances to step 710.

In step 710, the texture coordinates (S, T), which are coordinates in the bottom (highest resolution) layer having a layer depth of $D_{max}$, are converted into the texture coordinates (S, T)$_L$ in the layer $D_L$. The process described above with reference to steps 510 and 512 of FIG. 5A can be used. The pixels in the layer $D_L$ located closest to the point defined by the texture coordinates (S, T)$_L$ are identified, and their distances from the point (S, T)$_L$ are calculated. A first intra-layer interpolation operation is then performed using the texture color values of the identified texture pixels inversely weighted according to their distances from the point (S, T)$_L$. The first intra-layer interpolation operation calculates the texture color values $R_1$, $G_1$, $B_1$ for the texture pixel located at the texture coordinates (S, T)$_L$.

In step 712, a test is performed to determine whether the fractional part $D_f$ is greater than zero. If the test result is NO, indicating that no inter-layer interpolation is required, execution advances to step 714 where the texture color values $R_0$, $G_0$, $B_0$ are set to the values of the texture color values $R_1$, $G_1$, $B_1$, respectively, calculated in step 710. Execution then advances to step 720, which will be described below. If the test result is YES, indicating that inter-layer interpolation is required, execution advances to step 716.

In step 716, the texture coordinates (S, T) are converted into the texture coordinates (S, T)$_G$ in the layer $D_G$. The pixels in the layer $D_G$ located closest to the point defined by the texture coordinates (S, T)$_G$ are identified, and their distances from the point (S, T)$_G$ are calculated. A second intra-layer interpolation operation is then performed using the texture color values of the identified texture pixels inversely weighted according to their distances from the point (S, T)$_G$. The second intra-layer interpolation operation calculates the texture color values $R_2$, $G_2$, $B_2$ for the texture pixel located at the texture coordinates (S, T)$_G$.

In step 718, an inter-layer interpolation operation is performed to generate the texture color values for the texture pixel located at the coordinates (S, T)$_D$ in the layer having a layer depth of D. The interpolation uses the texture color values $R_1$, $G_1$, $B_1$ for the layer $D_L$, the texture color values $R_2$, $G_2$, $B_2$ for the layer $D_G$ and the fractional part $D_f$ of the layer depth D as a weighting factor. The inter-layer interpolation operation generates the texture color values $R_0$, $G_0$, $B_0$.

In step 720, the intensity coefficients for the rendering screen pixel are read from the field 316 of the pixel's cell 300 in the reference buffer 126 and are multiplied by the texture color values $R_0$, $G_0$, $B_0$ generated in step 714 or in step 718, depending on whether inter-layer interpolation was necessary. The resulting final color values are stored in the rendering screen pixel's location in the pixel/depth buffer 124.

Execution advances to step 722, whence it returns to the main routine.

FIG. 7B shows details of the routine executed in step 472 of the main routine shown in FIG. 4B to generate final color values for the rendering screen pixels in the progressive resolution display mode. This routine is executed for each pixel of the rendering screen having a 1 in the field 301 of the pixel's cell 300 in the reference buffer 126. A 1 in this field indicates that the pixel was derived from an object pixel located in a polygon to which a texture is to be applied. The final color values are obtained by multiplying the intensity coefficients calculated in step 454 by texture color values. The texture color values are obtained by interpolation from the pattern data of the currently-acquired tiles, i.e., the pattern data acquired in step 471 the first time the resolution improvement loop composed of steps 472–477 is executed, and the pattern data acquired in step 471 and the pattern data acquired in step 477 in subsequent executions of the resolution improvement loop. If the resolution provided by the pattern data of the currently-acquired tiles is not sufficient for the layer depth D calculated in step 454 of the main routine, the resolution improvement loop sets the tile load list entries of the tiles whose pattern data are required to provide the required resolution to "L" to indicate the pattern data that need to be acquired when step 477 is next executed. Execution begins at step 750.

Steps 752, 754, 756 and 758 are identical to steps 702, 704, 706 and 708 described above with reference to FIG. 7A, and will not be described again here.

In steps 760–766, the entries in the texture's tile load list are tested to locate the highest-resolution currently-acquired tile or tiles that can be used to interpolate the texture color values of the texture pixel located at the texture coordinates (S, T). The number of tiles in a layer necessary for interpolating the texture color values of the texture pixel located at the texture coordinates (S, T) may be 1, 2 or 4, depending on whether the texture coordinates define a point located entirely within a tile, at the border between two tiles or at the corner between four tiles, as described above. The tile load list testing begins in the portion of the tile load list corresponding to the layer $D_G$ of the pyramidal data structure. If the tile load list entries of the layer $D_G$ indicate that the pattern data of the one or more tiles necessary to interpolate the texture color values for the texture pixel at the texture coordinates (S, T) exist in the layer, the texture color values are interpolated from the pattern data of these tiles. Otherwise, the tile load list entries of the next-higher (next lower resolution) layer $D_G-1$ are tested. The tile load list entries of progressively higher layers, i.e., lower resolution layer, are tested until a layer that includes the necessary pattern data is found. The testing process always terminates with a valid result because the pattern data of the top tile are loaded in step 471 of the main routine before this routine is executed.

In step 760, the layer depth index d is set to $D_G$. In step 762, a routine similar to that described above with reference to FIG. 5A is performed to identify the tile or tiles in the current layer corresponding to the texture coordinates (S, T). In step 764, a test is performed to determine whether the tile load list entries for all the tiles identified in step 762 are set to "E," indicating that the pattern data for the tile have already been acquired and are stored in the texture's pyramidal data structure.

If the test result in step 764 is NO, indicating that the necessary pattern data do not exist in the current layer, execution advances to step 766 where the layer index is decremented by 1. Execution the returns to step 762 where the tile load list portion of the next-higher (next-lower resolution) layer is tested. If the test result is YES, indicating that the current layer includes the pattern data necessary for interpolating the texture color values of the texture pixel located at the texture coordinates (S, T), execution advances to step 768.

In step 768, the variable $D_1$ is set to the current value of the layer index d. The value of the variable $D_1$ indicates the layer depth of the layer at which the tile load list testing ended.

In step 770, an intra-layer interpolation operation is performed using the pattern data of the one or more tiles of the layer $D_1$ identified in step 762. The interpolation operation may be performed using the method described above with respect to step 710 of FIG. 7A. The interpolation operation generates the texture color values $R_1$, $G_1$, $B_1$ for the texture pixel located at the texture coordinates (S, T).

If $D_1$ is less than $D_G$, this means that the texture color values are generated with insufficient resolution for the layer depth D calculated in step 454 of the main routine. Additional pattern data need to be acquired to provide the necessary resolution. Therefore, in step 772, a test is performed to determine whether $D_1$ is equal to $D_G$.

If the test result is NO, execution passes to step 774, where the texture color values $R_0$, $G_0$, $B_0$ are set to the values of the texture color values $R_1$, $G_1$, $B_1$, respectively, calculated in step 770. Execution then advances to step 776, where the tile load list entries of the one or more tiles in the layer having a layer depth of $D_1+1$ required to interpolate the texture color values of the texture pixel located at the texture coordinates (S, T) are set to "L." This setting indicates that pattern data for these tiles must be acquired next time step 477 of the main routine described above with reference to FIG. 4B is executed.

Execution then advances to step 778, which will be described below.

If the test result obtained in step 772 is YES, execution advances to step 780. The YES result means that $D_1$ is equal to $D_G$, and the pattern data of the one or more tiles necessary to interpolate the texture color values of the texture pixel located at the texture coordinates (S, T) with the required resolution exist in the pyramidal data structure.

In step 780, an intra-layer interpolation operation is performed using the pattern data of one or more tiles of the layer $D_L=D_G-1$. The interpolation operation may be performed using the method described above with reference to step 710 of FIG. 7A. The interpolation operation generates the texture color values $R_2$, $G_2$, $B_2$ for the texture pixel located at the texture coordinates $(S, T)_L$ in the layer $D_L$.

In step 782, inter-layer interpolation for the texture pixel at the texture coordinates (S, T) in the layer D is performed between the texture color values $R_1$, $G_1$, $B_1$ for the layer $D_G$ generated in step 770 and the texture color values $R_2$, $G_2$, $B_2$ for the layer $D_L$ generated in step 780. The interpolation uses the fractional part $D_f$ of the layer depth D as a weighting factor. The inter-layer interpolation generates the texture color values $R_0$, $G_0$, $B_0$.

In step 778, the intensity coefficients for the rendering screen pixel are read from the field 316 of the pixel's cell 300 in the reference buffer 126 and are multiplied by the texture color values $R_0$, $G_0$, $B_0$ generated in step 770 or in step 782. The resulting final color values for the rendering screen pixel are stored in the rendering screen pixel's location in the pixel/depth memory 124.

Execution then advances to step 784, whence it returns to the main routine.

The invention has been described with reference to an example in which the tiles are arranged in the layers of the pyramidal data structure in conventional scanning order, i.e., left to right and top to bottom. However, the arrangement of the tiles in the layers is not critical, and different arrangements may be used. If a different arrangement is used, references to tiles located at the top-left, right-hand and bottom edges, and bottom, right-hand corner of the layer should be changed accordingly.

Although this disclosure describes illustrative embodiments of the invention in detail, it is to be understood that the invention is not limited to the precise embodiments described, and that various modifications may be practiced within the scope of the invention defined by the appended claims.

We claim:

1. Rendering apparatus for rendering an image in response to three-dimensional graphics data, the apparatus comprising:
   a path through which the rendering apparatus can receive the three-dimensional graphics data, the three-dimensional graphics data including polygon data and additionally including texture data defining a texture, the texture data including texture size data and sets of pattern data, the pattern data in each of the sets representing the texture with a different resolution, the pattern data constituting a majority of the texture data;
   a pixel/depth buffer including first memory cells, the first memory cells corresponding to pixels of a rendering screen;
   a reference buffer including second memory cells, the second memory cells corresponding to the pixels of the rendering screen; and
   a rendering engine that performs an initial rasterizing operation using only the polygon and texture size data to generate and to store in the reference buffer, for each of the pixels of the rendering screen, a texture identifier, a layer depth value indicating a texture resolution, and texture coordinates; that identifies, in response to the texture identifier, the layer depth and the texture coordinates stored in the reference buffer for each of the rendering screen pixels, ones of the pattern data required to render the image; that acquires via the path the ones of the pattern data identified as being required to render the image; and that generates image data representing the image using the pattern data acquired via the path, the path having a data transfer rate substantially smaller than data transfer rates between the rendering engine and the buffers.

2. The rendering apparatus of claim 1, additionally comprising a texture memory in which the pattern data are stored in a pyramidal data structure, the pyramidal data structure including layers in each of which are stored a respective one of the sets of the pattern data representing the texture with a different resolution, one of the sets of the pattern data representing the texture with a highest resolution.

3. The rendering apparatus of claim 2, in which:
   the initial rasterizing operation performed by the rendering engine additionally generates intensity coefficients for each one of the pixels of the rendering screen; and
   the intensity coefficients are additionally stored in one of the second memory cells of the reference buffer, the one of the second memory cells corresponding to the one of the pixels of the rendering screen.

4. The rendering apparatus of claim 2, in which:
   the pattern data belong to texture pixels arrayed in rectangular tiles;
   the apparatus additionally includes a tile load list for the texture, the tile load list including an entry for each of the tiles; and
   when the rendering engine identifies the ones of the pattern data required to render the image, the rendering engine reads the texture coordinates from the reference buffer to identify one of the tiles in which are located pattern data required to render the image, and sets the entry in the tile load list for the one of the tiles to a load state indicating that the pattern data of the one of the tiles are required to render the image.

5. The rendering apparatus of claim 4, in which, when the rendering engine acquires the pattern data required to render the image, the rendering engine tests the tile load list for the texture to identify the entries set to the load state, acquires the pattern data of each one the tiles whose entries in the tile load list are identified as being set to the load state, and changes the entry in the tile load list for the each one of the tiles whose pattern data have been acquired from the load state to an exist state, the exist indicating that the pattern data for the one of the tiles have been acquired.

6. The rendering apparatus of claim 2, in which:
   the pattern data belong to texture pixels arrayed in rectangular tiles;
   the rendering apparatus additionally includes a tile load list for the texture, the tile load list including an entry for each of the tiles, the entry indicating when the pattern data of the one of the tiles have been acquired; and
   when the rendering engine acquires the pattern data for one of the tiles located in one of the layers of the pyramidal data structure, the rendering engine checks the tile load list to determine whether the pattern data have been acquired for source tiles located in a layer immediately below the one of the layers, the source tiles being ones of the tiles from which the pattern data of the one of the tiles can be synthesized, and synthesizes the pattern data for the one of the tiles from the pattern data of the source tiles.

7. The rendering apparatus of claim 2, in which:
   the pattern data belong to texture pixels arrayed in rectangular tiles;
   the rendering engine acquires an initial part of the pattern data required to render the image by loading via the path the pattern data of one of the tiles constituting a top layer of the pyramidal data structure, and stores the one of the tiles in the pyramidal data structure; and
   the rendering engine generates the image data from the pattern data extant in the pyramidal data structure, and afterwards identifies the ones of the tiles of the pyramidal data structure whose pattern data are required to render the image with a higher resolution, acquires the pattern data of the identified tiles, and regenerates the image data with a higher resolution.

8. The rendering apparatus of claim 7, in which the rendering engine repetitively performs a routine in which the ones of the tiles whose pattern data are required to render the image with the higher resolution are identified, the pattern data of the identified tiles are acquired and the image data are regenerated with the higher resolution until the image data are all generated with a best resolution, the best resolution for the image data corresponding to a subset of the pixels of the rendering screen being less than the highest resolution.

9. The rendering apparatus of claim 1, in which the rendering engine acquires the pattern data required to render the image by one of (a) loading the pattern data via the path, and (b) synthesizing the pattern data.

10. The rendering apparatus of claim 1, in which:
    the layer depth value is a real number having an integer part and a fractional part;
    when fractional part of the layer depth value is zero, the rendering engine performs a first intra-layer interpolation among the pattern data in a one of the sets indicated by the integer part of the layer depth value to generate texture color values from which it derives the image data; and
    when the fractional part of the layer depth value is non-zero, the rendering engine performs the first intra-layer interpolation, a second intra-layer interpolation among the pattern data in another of the sets having one level higher resolution than the one of the sets, and an inter-layer interpolation between results generated by the first and second intra-layer interpolations to generate the texture color values from which it derives the image data.

11. A method of rendering an image in response to three-dimensional graphics data, the image being represented by image data corresponding to pixels of a rendering screen, the three-dimensional graphics data including polygon data and additionally including texture data defining a texture, the texture data including texture size data and sets of pattern data, the pattern data in each of the sets representing the texture with a different resolution, the pattern data constituting a majority of the texture data, the method comprising:

receiving the polygon and texture size data;

performing an initial rasterizing operation for each one of the pixels of the rendering screen, the initial rasterizing operation being performed using the polygon and texture size data and generating and storing a texture identifier, a layer depth value indicating a texture resolution, and texture coordinates;

performing a pattern data identifying operation in response to the texture identifier, the layer depth and the texture coordinates stored for each one of the rendering screen pixels, the pattern data identifying operation identifying ones of the pattern data required to render the image;

performing a pattern data acquiring operation in which are acquired the ones of the pattern data identified by the pattern data identifying operation as being required to render the image; and performing a final rasterizing operation in which the image data representing the image are generated using the pattern data acquired by the pattern data acquiring operation.

12. The image rendering method of claim 11, additionally comprising:

providing texture memory; and storing the pattern data acquired by the pattern data acquiring operation in the texture memory in a pyramidal data structure, the pyramidal data structure including layers in each of which are stored a respective one of the sets of the pattern data representing the texture with a different resolution, one of the sets of the pattern data representing the texture with a highest resolution.

13. The image rendering method of claim 12, in which:

the initial rasterizing operation additionally generates intensity coefficients for the one of the pixels of the rendering screen; and the intensity coefficients are stored together with the texture identifier, layer depth value and texture coordinates for the one of the pixels of the rendering screen.

14. The image rendering method of claim 12, in which:

the pattern data belong to texture pixels arrayed in rectangular tiles;

the method additionally comprises providing a tile load list for the texture, the tile load list including an entry for each of the tiles; and the data pattern identifying operation includes:

reading the texture coordinates to identify one of the tiles in which are located pattern data required to render the image, and setting the entry in the tile load list for the one of the tiles to a load state, the load state indicating that the pattern data of the one of the tiles are required to render the image.

15. The image rendering method of claim 14, in which the pattern data acquiring operation includes:

testing the tile load list for the texture to identify the entries set to the load state;

acquiring the pattern data of each one the tiles whose entries in the tile load list are identified as being set to the load state; and changing the entry in the tile load list for the each one of the tiles whose pattern data have been acquired from the load state to an exist state, the exist indicating that the pattern data for the one of the tiles have been acquired.

16. The image rendering method of claim 12, in which:

the pattern data belong to texture pixels arrayed in rectangular tiles;

the method additionally comprises providing a tile load list for the texture, the tile load list including an entry for each of the tiles, the entry having a state that indicates that the pattern data of the one of the tiles exist in the pyramidal data structure; and the pattern data acquiring operation performed to acquire the pattern data for one of the tiles located in one of the layers of the pyramidal data structure includes:

checking the tile load list to determine whether the pattern data for source tiles located in a layer immediately below the one of the layers exist in the pyramidal data structure, the source tiles being ones of the tiles from which the pattern data of the one of the tiles can be synthesized, and when the pattern data for the source tiles exist in the pyramidal data structure, synthesizing the pattern data for the one of the tiles from the pattern data of the source tiles.

17. The image rendering method of claim 12, in which:

the pattern data belong to texture pixels arrayed in rectangular tiles;

the pattern data of a one of the tiles constituting a top layer of the pyramidal data structure are received and stored in the pyramidal data structure, and the final rasterizing operation is performed prior to the pattern data identifying operation being performed, the final rasterizing operation generating the image data from the pattern data extant in the pyramidal data structure;

the pattern data identifying operation identifies the ones of the tiles of the pyramidal data structure whose pattern data are required to render the image with a higher resolution; and the method additionally comprises repeating the final rasterizing operation after the pattern data acquiring operation to regenerate the image data with a higher resolution.

18. The image rendering method of claim 17, in which the final rasterizing operation, the pattern data identifying operation and the pattern data acquiring operation are iterated until the image data are all generated with a best resolution, the best resolution for the image data corresponding to a subset of the pixels of the rendering screen being less than the highest resolution.

19. The image rendering method of claim 11, in which the pattern data acquiring operation includes acquiring the pattern data required to render the image by one of (a) loading the pattern data, and (b) synthesizing the pattern data.

20. The image rendering method of claim 11, in which:

performing the initial rasterizing operation generates a layer depth value as a real number having an integer part and a fractional part; and performing the final rasterizing operation includes:

when the fractional part of the layer depth value is zero, performing a first intra-layer interpolation among the pattern data in a one of the sets identified by the integer part of the layer depth value to generate texture color values, and deriving the image data from the texture color values, and when the fractional part of the layer depth value is non-zero, performing the first intra-layer interpolation, performing a second intra-layer interpolation among the pattern data in another of the sets having one level higher resolution than the one of the sets, performing an inter-layer interpolation between results generated by the first and second intra-layer interpolation operations to generate the texture color values, and deriving the image data from the texture color values.

* * * * *